(12) United States Patent
Guyaguler et al.

(10) Patent No.: US 8,620,715 B2
(45) Date of Patent: Dec. 31, 2013

(54) METHOD INCLUDING A FIELD MANAGEMENT FRAMEWORK FOR OPTIMIZATION OF FIELD DEVELOPMENT AND PLANNING AND OPERATION

(75) Inventors: Baris Guyaguler, Oxford (GB); Kassem Ghorayeb, Al-Khobar (SA)

(73) Assignee: Schlumberger Technology Corporation, Houston, TX (US)

( * ) Notice: Subject to any disclaimer, the term of this patent is extended or adjusted under 35 U.S.C. 154(b) by 1347 days.

(21) Appl. No.: 11/801,741

(22) Filed: May 10, 2007

(65) Prior Publication Data
US 2007/0299643 A1  Dec. 27, 2007

Related U.S. Application Data

(60) Provisional application No. 60/812,682, filed on Jun. 10, 2006, provisional application No. 60/817,158, filed on Jun. 28, 2006.

(51) Int. Cl.
*G06G 1/14* (2006.01)
*G06Q 40/00* (2012.01)

(52) U.S. Cl.
USPC ........................................ 705/7.22; 705/7.36

(58) Field of Classification Search
USPC .............................................. 705/7.36, 7.22
See application file for complete search history.

(56) References Cited

U.S. PATENT DOCUMENTS 5,706,896 A * 1/1998 Tubel et al. ................... 166/313
5,975,204 A * 11/1999 Tubel et al. ............... 166/250.15
5,992,519 A * 11/1999 Ramakrishnan et al. ......................... 166/250.15

(Continued)

OTHER PUBLICATIONS

SPE 102557 "Integrated Optimization of Field Development, Planning, and Operation", Sep. 24, 2006.

(Continued)

*Primary Examiner* — R. David Rines
*Assistant Examiner* — Amanda Gurski
(74) *Attorney, Agent, or Firm* — Lam Nguyen; Rodney Warfford

(57) ABSTRACT

A method of performing Field Management is disclosed, a Field Management system including a portable Field Management (FM) framework being initially decoupled from any simulators, one or more adaptors operatively connected to the FM framework, and one or more open interfaces associated, respectively, with the one or more adaptors, the open interfaces each having interface characteristics, the method comprising: modifying one or more of the simulators such that the simulators adhere to the interface characteristics of the open interfaces of the one or more adaptors which are operatively connected to the FM framework; subsequently coupling the one or more modified simulators to the one or more open interfaces of the one or more adaptors of the FM framework in response to the modifying step; and performing the Field Management on the condition that the one or more modified simulators are coupled to the one or more open interfaces of the one or more adaptors of the FM framework. The FM framework is also flexible in that it allows control over how the FM Framework logic is executed in order to accommodate real field situations that require such control.

27 Claims, 22 Drawing Sheets

(56) References Cited

U.S. PATENT DOCUMENTS

| | | | |
|---|---|---|---|
| 6,526,426 B1* | 2/2003 | Lakritz | 715/264 |
| 6,622,574 B2* | 9/2003 | Fincke | 73/861.63 |
| 6,829,570 B1 | 12/2004 | Thambynayagam | |
| 6,980,940 B1* | 12/2005 | Gurpinar et al. | 703/10 |
| 7,876,705 B2* | 1/2011 | Gurpinar et al. | 370/254 |
| 2003/0225606 A1* | 12/2003 | Raghuraman et al. | 705/7 |
| 2004/0010374 A1 | 1/2004 | Raghuraman | |
| 2004/0268338 A1* | 12/2004 | Gurpinar et al. | 717/169 |
| 2005/0149307 A1* | 7/2005 | Gurpinar et al. | 703/10 |
| 2006/0085174 A1* | 4/2006 | Hemanthkumar et al. | 703/10 |

OTHER PUBLICATIONS

Barroux et al., "SPE 65159: Linking reservoir and surface simulators: how to improve the coupled solutions," SPE International, 2000: pp. 1-14.

Ghorayeb et al., "SPE 79702: A General Purpose Controller for Coupling Multiple Reservoir Simulations and Surface Facility Networks," SPE International, 2003: pp. 1-15.

Ghorayeb et al., "SPE 92381: Field Planning Using Integrated Surface/Subsurface Modeling," SPE International, 2005: pp. 1-9.

Guyaguler et al., "SPE 105200: A New Production Allocation Optimization Framework," SPE International, 2007: pp. 1-9.

* cited by examiner

ILLUSTRATION OF FLEXIBILITY: EXPRESSIONS

WHEN BUILDING A STRATEGY FOR PREDICTING A FIELD FUTURE PRODUCTION, THE ENGINEER USES THE FM FRAMEWORK'S EXPRESSIONS FOR:
- ORDERING OF ENTITIES IN BUILDING DYNAMIC FLOW-ENTITY LISTS
- SELECTION-CRITERIA FOR BUILDING DYNAMIC LIST OF ENTITIES
- TRIGGERING AND SUCCESS-CRITERIA FOR INSTRUCTIONS
- CONSTRAINTS/OBJECTIVES FOR BALANCING ACTIONS
- CUSTOMIZED FM

— 57

↓

WHEN BUILDING AND EXPRESSION, THE ENGINEER CAN USE ANY PROPERTY (e.g. PRODUCTION OIL RATE, RESERVOIR VOLUME GAS INJECTION RATE, BOTTOM HOLE PRESSURE, etc.) AND ANY APPROPRIATE FLOW ENTITY STATUS (OPEN, CLOSED, SHUT, etc.) COMBINED TO ANY APPROPRIATE FLOW ENTITY (WELL, WELL LIST, COMPLETIONS, etc.)

— 60

↓

EXPRESSIONS CAN BE AS COMPLEX AS NECESSARY AND APPROPRIATE (LINEAR, NON-LINEAR, etc.). EXPRESSIONS CAN BE NESTED TO USE MORE SOPHISTICATED EXPRESSIONS

ILLUSTRATION OF FLEXIBILITY: FLOW ENTITIES

64 — THE ENGINEER WANTS TO BUILD A STRATEGY IN WHICH HE/SHE HAS A FIELD WATER PRODUCTION LIMIT TO OBEY. HE/SHE DECIDES THAT THE OPTIMAL SCENARIO CONSISTS ON PERFORMING THE FOLLOWING EVERY TIME THE WATER PRODUCTION LIMIT IS HIT:
- SELECT THE GROUP OF WELLS THAT IS PRODUCING ABOVE A PREDEFINED WATER CUT
- SELECT THE WELL IN THAT GROUP THAT IS PRODUCING THE MOST WATER
- SHUT THE SELECTED COMPLETION

↓

66 — THE ENGINEER BUILDS A DYNAMIC LIST OF GROUPS TO WHICH ONLY GROUPS WITH WATER CUT HIGHER THAN THE PREDEFINED LIMIT BELONG (MEMBERSHIP TO THE LIST GETS UPDATED EVERY TIME THE LIST IS USED). THE LIST WHEN UPDATED RESULTS ON SELECTING THE GROUP THAT HAS THE HIGHEST WATER CUT AMONG ALL GROUPS THAT BELONG TO THE LIST

↓

68 — THE ENGINEER BUILDS A DYNAMIC LIST OF WELLS THAT, WHEN UPDATED, RESULTS ON THE WELL WITH HIGHEST WATER PRODUCTION RATE AMONG ALL THE PRODUCTION WELLS THAT BELONG TO THE SELECTED GROUP

↓

70 — THE ENGINEER BUILDS A DYNAMIC LIST OF WELL COMPLETIONS THAT, WHEN UPDATED, RESULTS ON THE COMPLETION WITH HIGHEST WATER PRODUCTION RATE AMONG ALL THE COMPLETIONS OF THE SELECTED WELL

FIG.6

METHOD INCLUDING A FIELD MANAGEMENT FRAMEWORK FOR OPTIMIZATION OF FIELD DEVELOPMENT AND PLANNING AND OPERATION

CROSS REFERENCE TO RELATED APPLICATIONS

This is a Utility Application of: (1) prior pending Provisional Application Ser. No. 60/812,682 filed Jun. 10, 2006, and (2) prior pending Provisional Application Ser. No. 60/817,158 filed Jun. 28, 2006

BACKGROUND

The subject matter disclosed in this specification relates to a method for reservoir Field Management, including a corresponding system and program storage device and computer program, adapted for integrated optimization of reservoir field development, planning, and operation. The method for Field Management further includes a Field Management Framework (hereinafter referred to as an 'FM Framework') that is portable, flexible, and extensible, the FM Framework adapted to be completely decoupled from surface and subsurface simulators and further adapted to be subsequently coupled to the surface and subsurface simulators via an FM Interface of an adaptor of the FM Framework for performing Field Management (FM) functions.

Traditionally, the Field Management (FM) functionality has been distributed among subsurface reservoir simulator(s), surface facility network simulator(s), and the 'controller' that couples the reservoir simulators to the network simulators. Furthermore, traditional Field Management tools lack the flexibility and extensibility needed to handle different oil field production strategies. This specification discloses a portable, flexible, and extensible Field Management (FM) Framework that is completely decoupled from and can be subsequently coupled to the surface facility network simulators and the subsurface reservoir simulators via an interface of an adaptor of the FM Framework. The FM Framework provides an innovative approach for portability, extensibility, and flexibility thereby enabling unlimited horizons for advanced Field Management (FM) users.

SUMMARY

One aspect of the present invention involves a method of Field Management in a Field Management system, comprising: (a) checking if execution of a Field Management (FM) strategy is needed; and (b) executing the Field Management strategy.

Another aspect of the present invention involves a method of performing Field Management, a Field Management system including a portable Field Management framework initially decoupled from any simulators, one or more adaptors operatively connected to the Field Management framework, and one or more open interfaces associated, respectively, with the one or more adaptors, the open interfaces each having interface characteristics, the method comprising: modifying one or more of the simulators such that the simulators adhere to the interface characteristics of the open interfaces of the one or more adaptors which are operatively connected to the Field Management framework; subsequently coupling the one or more modified simulators to the one or more open interfaces of the one or more adaptors of the Field Management framework in response to the modifying step; and performing the Field Management on the condition that the one or more modified simulators are coupled to the one or more open interfaces of the one or more adaptors of the Field Management framework.

Another aspect of the present invention involves a program storage device readable by a machine, tangibly embodying a set of instructions executable by the machine, to perform method steps for performing Field Management, a Field Management system including a portable Field Management framework initially decoupled from any simulators, one or more adaptors operatively connected to the Field Management framework, and one or more open interfaces associated, respectively, with the one or more adaptors, the open interfaces each having interface characteristics, the method comprising: modifying one or more of the simulators such that the simulators adhere to the interface characteristics of the open interfaces of the one or more adaptors which are operatively connected to the Field Management framework; subsequently coupling the one or more modified simulators to the one or more open interfaces of the one or more adaptors of the Field Management framework in response to the modifying step; and performing the Field Management on the condition that the one or more modified simulators are coupled to the one or more open interfaces of the one or more adaptors of the Field Management framework.

Another aspect of the present invention involves a computer program adapted to be executed by a processor, the computer program, when executed by the processor, conducting a process for performing Field Management, a Field Management system including a portable Field Management framework initially decoupled from any simulators, one or more adaptors operatively connected to the Field Management framework, and one or more open interfaces associated, respectively, with the one or more adaptors, the open interfaces each having interface characteristics, the process comprising: modifying one or more of the simulators such that the simulators adhere to the interface characteristics of the open interfaces of the one or more adaptors which are operatively connected to the Field Management framework; subsequently coupling the one or more modified simulators to the one or more open interfaces of the one or more adaptors of the Field Management framework in response to the modifying step; and performing the Field Management on the condition that the one or more modified simulators are coupled to the one or more open interfaces of the one or more adaptors of the Field Management framework.

Another aspect of the present invention involves a program storage device readable by a machine, tangibly embodying a set of instructions executable by the machine, to perform method steps of Field Management in a Field Management system, the method steps comprising: (a) checking if execution of a Field Management (FM) strategy is needed; and (b) executing the Field Management strategy.

Further scope of applicability will become apparent from the detailed description presented hereinafter. It should be understood, however, that the detailed description and the specific examples set forth below are given by way of illustration only, since various changes and modifications within the spirit and scope of the 'FM Framework', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIG. 5 provides a second illustration of the 'Flexibility' of the FM Framework, the term 'Flexibility' in this second sense reflecting the various use of 'expressions' by the FM Framework;

FIG. 6 provides a third illustration of the 'Flexibility' of the FM Framework, the term 'Flexibility' in this third sense reflecting the use of 'flow entities' by the FM Framework;

FIG. 15 illustrates the structure details of a reservoir simulator representation (adaptor) within the FM framework;

FIG. 17 illustrates the structure details of a surface-network simulator representation (adaptor) within the FM framework;

DESCRIPTION

Field Management (FM) is a simulation workflow through which predictive scenarios are carried out in order to assist in reservoir field development plans, surface facility design and de-bottlenecking, uncertainty and sensitivity analysis, and instantaneous or lifetime revenue optimization from a hydrocarbon reservoir/field. The function of 'Field Management' has been distributed among reservoir simulators and a controller that couples the reservoir simulators to surface facility network simulators. As a consequence of the relative isolation of these different simulators, the 'Field Management' plans and scenarios are generally tightly integrated to the specific simulators used in the workflow. However, the 'Field Management' function is independent of the brand of the simulators, the details of the physics being modeled, and the mathematical approaches used in these simulators. As a result, an independent and unified 'FM Framework' is needed, and that independent and unified 'FM Framework' is disclosed in this specification. The 'FM Framework' disclosed in this specification is completely decoupled from surface facility network simulators and subsurface reservoir simulators. However, the 'FM Framework' includes one or more adaptors, each adaptor having a corresponding 'open interface'. As a result, one or more of the surface or subsurface simulators, and one or more external Field Management algorithms, can be operatively coupled to the 'FM Framework' via the 'open interface' of an adaptor of the 'FM Framework' for the purpose of performing Field Management functions. In this specification, the Field Management (FM) function is performed by the 'FM Framework'.

Figure 1:
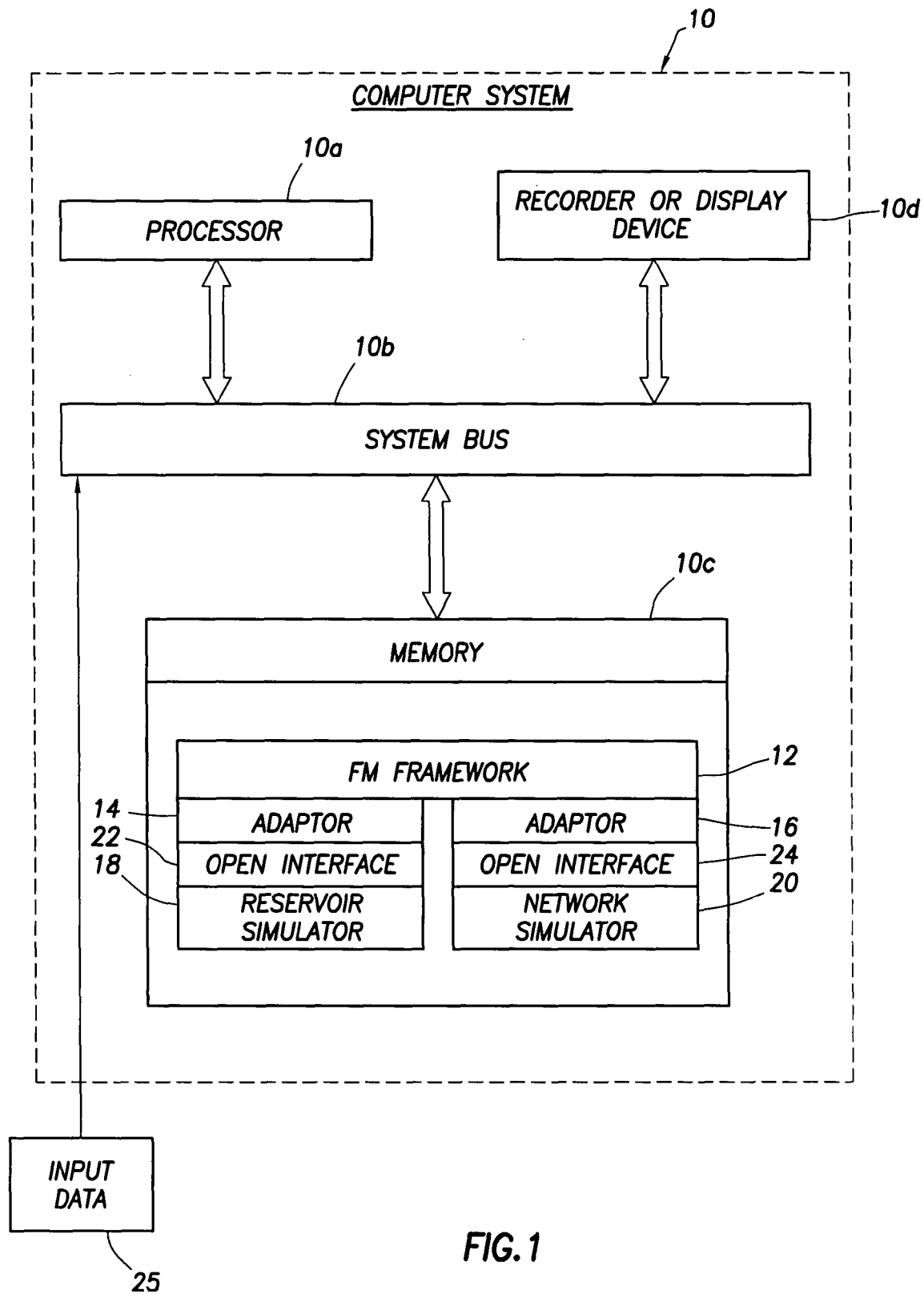
FIG. 1 illustrates a computer system adapted for storing the FM Framework, the adaptors, the subsurface reservoir simulators, and the surface facility network simulators, the simulators adapted to be coupled to the FM Framework via the open interface of the adaptors of the FM Framework.

Referring to FIG. 1, a workstation, personal computer, or other computer system 10 is illustrated which is adapted for storing the FM Framework, the adaptors of the FM Framework, the subsurface reservoir simulators, and the surface facility network simulators, wherein the simulators are adapted to be coupled to the FM Framework via the open interface of the adaptors of the FM Framework. The computer system 10 of FIG. 1 includes a Processor 10a operatively connected to a system bus 10b, a memory or other program storage device 10c operatively connected to the system bus 10b, and a recorder or display device 10d operatively connected to the system bus 10b. The computer system 10 is responsive to a set of 'input data' 25 which will be discussed in greater detail later in this specification. The memory or other program storage device 10c stores the FM Framework 12 adapted for practicing the Field Management (FM) function, the adaptors 14 and 16 of the FM Framework 12, the subsurface reservoir simulator(s) 18, and the surface facility network simulator(s) 20, wherein the simulators 18 and 20 are adapted to be coupled to the FM Framework 12 via the open interfaces 22 and 24 of the adaptors 14 and 16 of the FM Framework 12. The 'FM Framework' 12 including its adaptors 14 and 16 and their respective open interfaces 22 an 24 and the simulators 18 and 20 (hereinafter termed 'software'), which are stored in the memory 10c of FIG. 1, can be initially stored on a Hard Disk or CD-Rom, where the Hard Disk or CD-Rom is also a 'program storage device'. The CD-Rom can be inserted into the computer system 10, and the above referenced 'software' can be loaded from the CD-Rom and into the memory/program storage device 10c of the computer system 10 of FIG. 1. The Processor 10a will execute the 'software' (including the simulators 18 and 20 and the FM Framework 12 of FIG. 1) that is stored in memory 10c of FIG. 1 in response to the 'input data' 25; and, responsive thereto, the Processor 10a will generate an 'output display' that is recorded or displayed on the Recorder or Display device 10d of FIG. 1. The 'output display', which is recorded or displayed on the Recorder or Display device 10d of FIG. 1, is used by experienced geophysicists to predict the existence of oil and/or gas and/or other hydrocarbons that may reside in an Earth formation, similar to the Earth formation of FIG. 27. That oil and/or gas or other hydrocarbons may be extracted from the Earth formation using the drilling rig illustrated in FIG. 28. The computer system 10 of FIG. 1 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 10c (including the above referenced Hard Disk or CD-Rom) is a 'computer readable medium' or a 'program storage device' which is readable by a machine, such as the processor 10a. The processor 10a may be, for example, a microprocessor, microcontroller, or a mainframe or workstation processor. The memory or program storage device 10c, which stores the above referenced "software", may be, for example, a hard disk, ROM, CD-ROM, DRAM, or other RAM, flash memory, magnetic storage, optical storage, registers, or other volatile and/or non-volatile memory.

The method steps of 'Field Management (FM)' that are practiced by the 'FM Framework' 12 of FIG. 1 include or involve: (1) 'Strategy' which involves encapsulating a list of instructions and an optional balancing action; one might construct several strategies to be executed at different times of a simulation run; only one strategy is active at one time, (2) 'Instruction' which ties a list of actions to a triggering-criterion; 'Actions' are executed in the attempt to meet the instruction's success-criterion (i.e. desired well/group/field operating condition), and (3) 'Action' which encapsulates commands resulting in modifications of one or more 'flow-entities'. There are two categories of 'Actions': (3a) a 'Topology Modifying Action' which modifies the state of 'flow-entities' (e.g. open a well, close a completion interval) or changes 'boundary conditions' (e.g. add a new flow rate constraint to a well), and (3b) 'Balancing Action' which allocates 'rates' (e.g. by optimization, surface-network balancing, or heuristic group control) to existing 'flow-entities' without modifying any of the flow-entities' states.

Figure 2:
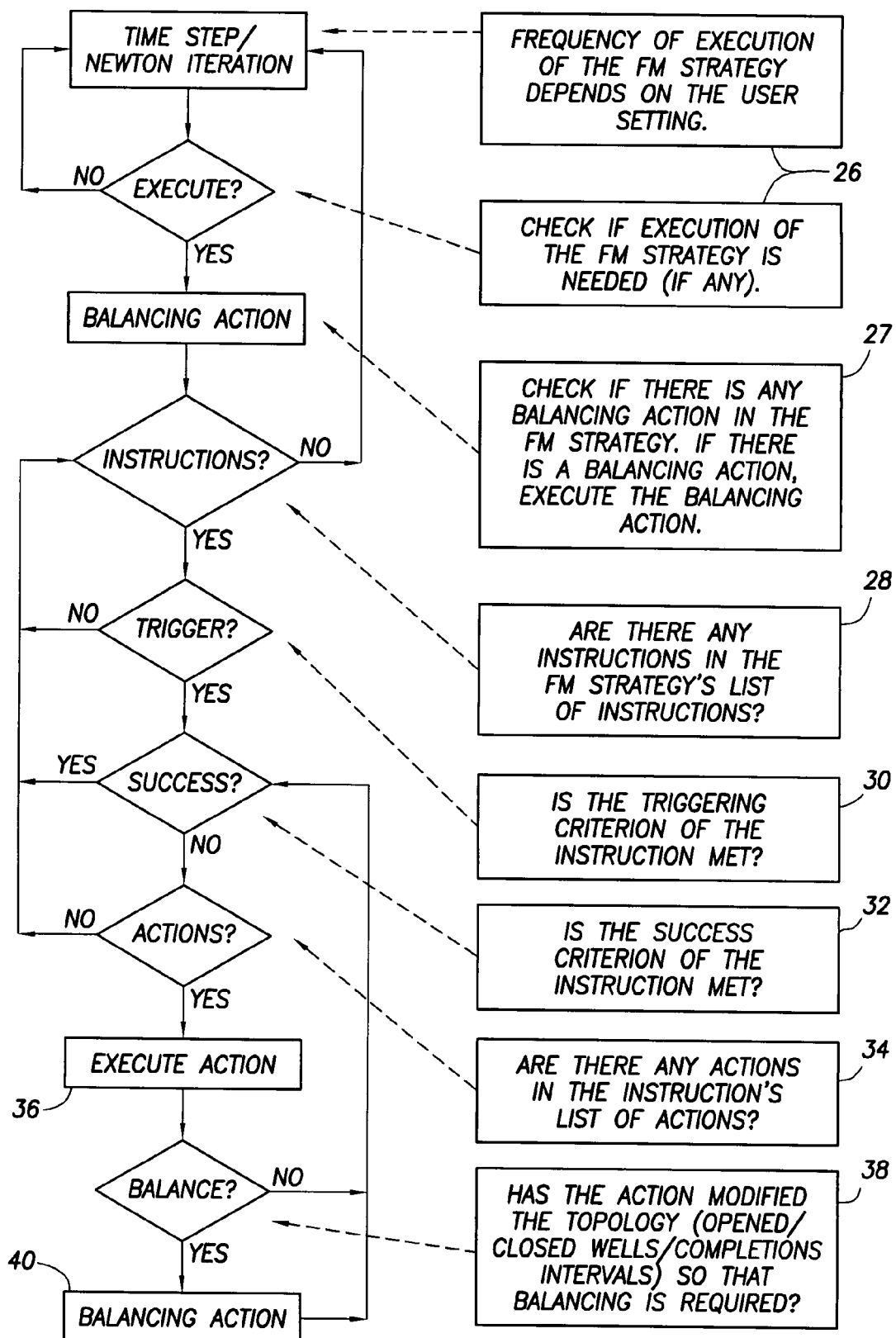
FIG. 2 illustrates a series of steps of a Field Management method representing a Field Management (FM) Framework strategy execution loop, the method of FIG. 2 being practiced by the FM Framework of FIG. 1.

Referring to FIG. 2, a 'Field Management' method or function, which is practiced by the 'FM Framework' 12 of FIG. 1, includes the step of: executing, at a prescribed frequency, a 'Field Management Strategy'. The method steps associated with the aforementioned 'Field Management Strategy' are illustrated in FIG. 2. As a result, FIG. 2 illustrates the method steps associated with a 'Field Management Strategy' which is associated with a 'Field Management function' which is further associated with the aforementioned 'FM Framework' 12 of FIG. 1.

In FIG. 2, the steps associated with a 'Field Management (FM) Strategy' corresponding to a method for 'Field Management' associated with the 'FM Framework' 12 of FIG. 1 comprise: determining a frequency of execution of the FM Strategy and checking if execution of a Field Management (FM) strategy is needed, step 26 in FIG. 2. If execution of the FM strategy is needed in response to the checking step, checking if there is any balancing action in the strategy. If there is a balancing action, execute the balancing action, step 27 in FIG. 2. Then, determine if there is any instruction in the FM strategy's list of instructions, step 28 of FIG. 2. If there is an instruction in the FM strategy's list of instructions, determine if a triggering criterion of the instruction is met, step 30 of FIG. 2. If the triggering criterion of the instruction is met, determine if a success criterion of the instruction is met, step 32 of FIG. 2. If the success criterion of the instruction is not met, determine if there are any actions in the instruction's list of actions, step 34 of FIG. 2. If there are actions in the instruction's list of actions, executing the actions, step 36 of FIG. 2, a Field Management Strategy being executed when the actions are executed. In response to the step of executing the actions, determine if the actions modified a topology in a predetermined manner such that balancing (i.e., executing the balancing action) is required, step 38 of FIG. 2. If the balancing is required, execute a balancing action, step 40 of FIG. 2.

The 'FM Framework' 12 of FIG. 1 exhibits the following properties:
The 'FM Framework' 12 is 'Portable';
The 'FM Framework' 12 is 'Flexible'; and
The 'FM Framework' 12 is 'Extensible'.

Each of these properties of 'Portability' and 'Flexibility' and 'Extensibility', which are associated with the 'FM Framework' 12 of FIG. 1, will be discussed in the following paragraphs with reference to FIGS. 3 through 9 of the drawings.

The Portability of the FM Framework 12

The 'Portability' of the 'FM Framework' 12 can be explained as follows. The 'FM Framework' 12 has a clearly defined interface for simulators (surface and subsurface) and external FM algorithms. Any black-box simulator may become part of the Field Management (FM) system by simply adhering to the FM adaptor interface. The FM adaptor interface helps decouple mathematical modeling details from reservoir engineering concepts. This means that the Field Management (FM) strategies remain unchanged when the details of the underlying mathematical model changes.

Figure 14:
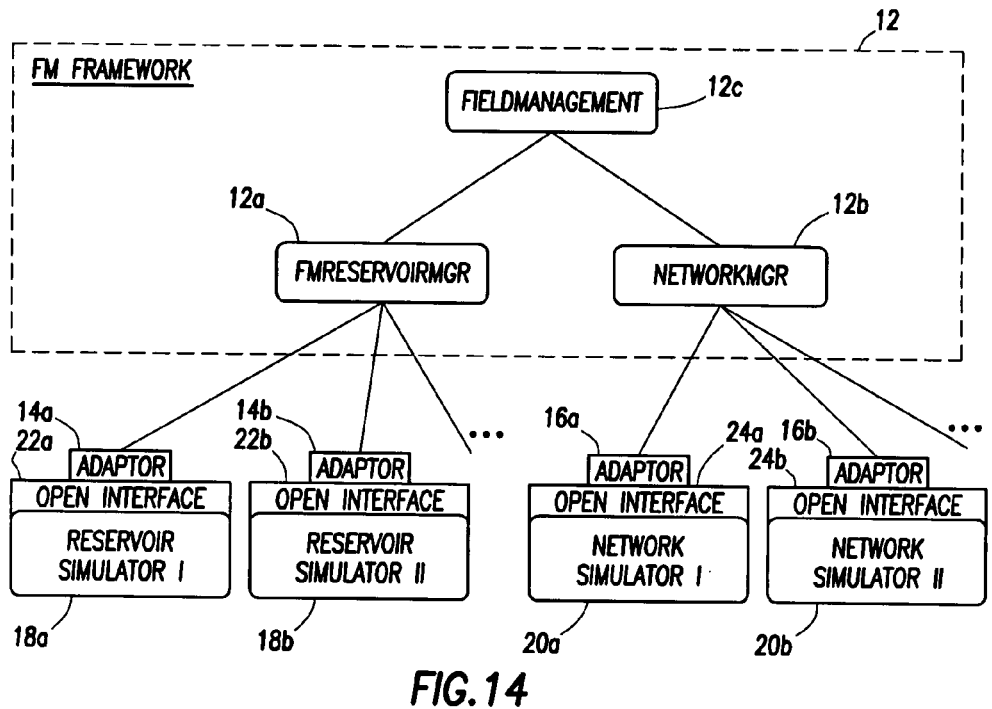
FIG. 14 illustrates how the 'FMReservoirMgr' node and the 'NetworkMgr' node of the FM Framework of FIG. 10 are each adapted to be operatively coupled to and then subsequently decoupled from one or more subsurface reservoir simulators and surface facility network simulators via an open interface of an adaptor of the FM Framework.
Figure 15:
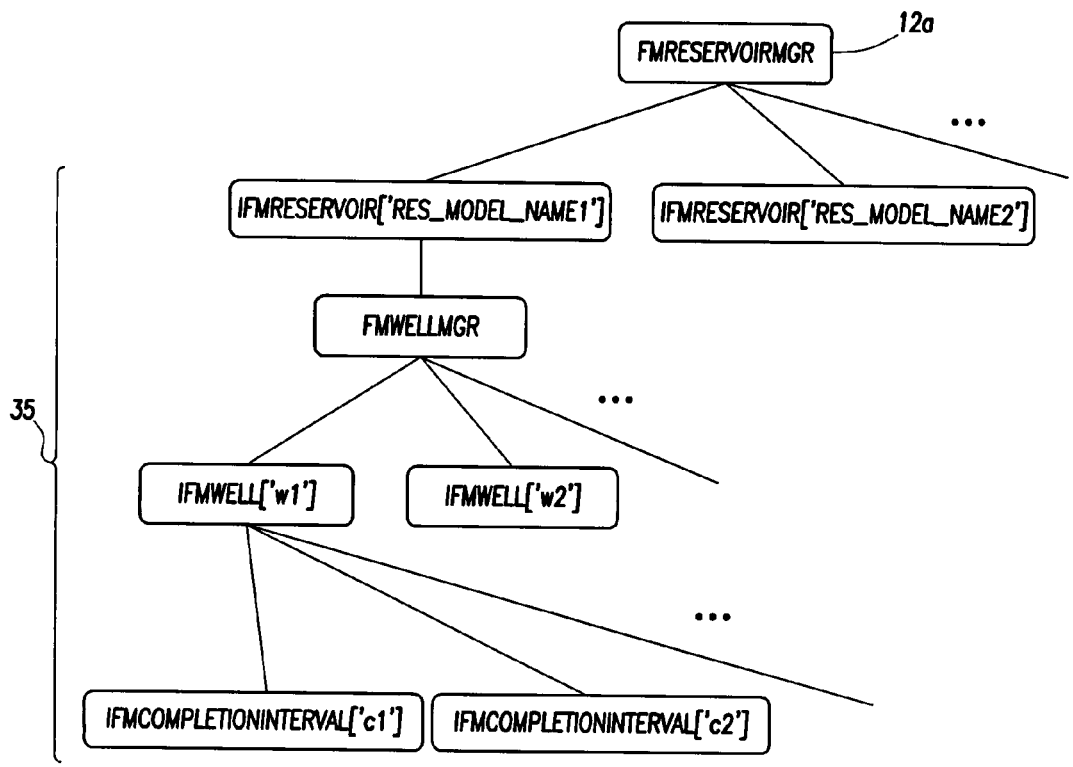
FIG. 15 illustrates a detailed construction of the open interface of the adaptor of the 'FMReservoirMgr' node of the Field Management Framework of FIG. 14, and, in particular.
Figure 16:
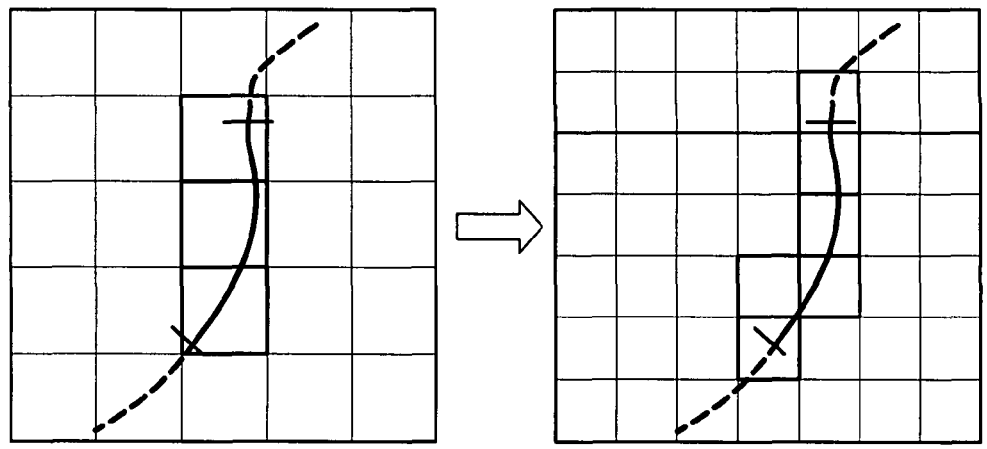
FIG. 16 illustrates how the underlying representation of a completion interval might change from one reservoir simulation model to another, but the definition/concept of the completion interval remains the same.
Figure 17:
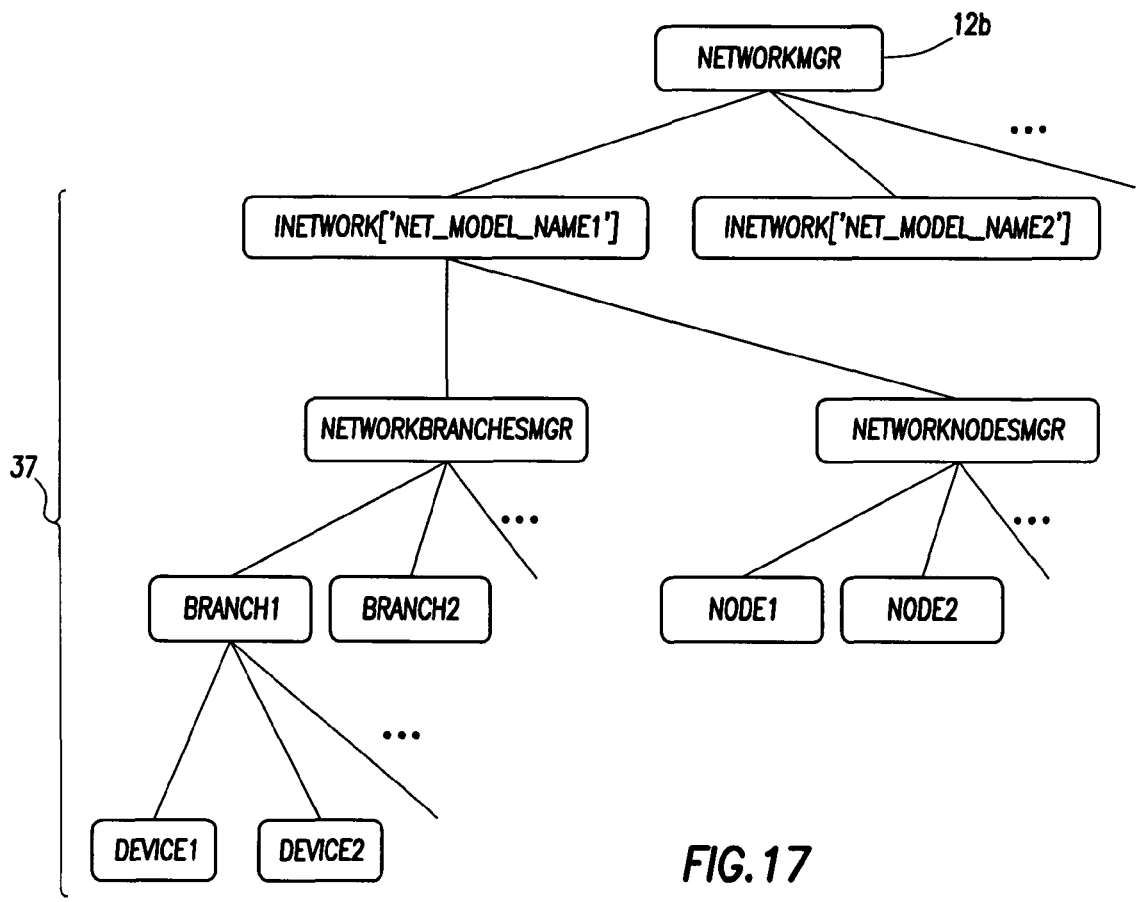
FIG. 17 illustrates a detailed construction of the open interface of the adaptor of the 'NetworkMgr' node of the Field Management Framework of FIG. 14, and, in particular.

Refer to FIGS. 14, 15, 16, and 17. In connection with FIG. 14, the 'FM framework' 12 of FIG. 1 is shown in greater detail in FIG. 14. In FIG. 14, the open interface 22a, 22b, 24a, 24b of the adaptors 14a, 14b, 16a, 16b, that are used to interface different surface network simulators 20a, 20b and subsurface reservoir simulators 18a-18b to the FM Framework 12, is illustrated in FIG. 14. In connection with FIG. 15, the published structure details of the open interface 22a, 22b associated with the adaptors 14a, 14b of the 'FMReservoirMgr' node 12a of the FM Framework 12 of FIG. 14 are illustrated in FIG. 15. In connection with FIG. 17, the published structure details of the open interface 24a, 24b associated with the adaptors 16a, 16b of the 'NetworkMgr' node 12b of the FM Framework 12 of FIG. 14 are illustrated in FIG. 17. In connection with FIG. 16, the FIG. 16 illustrates the concept that the underlying representation of a completion interval might change from one reservoir simulation model to another, but the definition/concept of the completion interval remains the same.

In FIGS. 14 through 17, referring initially to FIG. 14, the 'FM Framework' 12 of FIG. 1 further includes an 'FMReservoirMgr' node 12a, a 'NetworkMgr' node 12b, and a 'FieldManagement' node 12c operatively connected to the 'FMReservoirMgr' node 12a and the 'NetworkMgr' node 12b. The 'FieldManagement' node 12c is adapted for practicing the previously discussed steps of FIG. 2 which represent a 'Field Management Strategy' corresponding to a method for 'Field Management' associated with the 'FM Framework' 12 of FIGS. 1 and 14. The 'Field Management (FM) Framework' 12 of FIG. 14 is completely decoupled from surface facility network simulators 20a, 20b and subsurface reservoir simulators 18a, 18b. However, in FIG. 14, the 'FM Framework' 12 has a clearly defined 'open interface' 22a, 22b, 24a, 24b for simulators 18a, 18b, 20a, 20b and any other external Field Management (FM) algorithms. The 'open interface' 22a and 22b in FIG. 14 represents an interface for the reservoir simulators 18a and 18b and the 'open interface' 24a and 24b in FIG. 14 represents an interface for the network simulators 20a and 20b. In FIG. 14, any black-box simulator or algorithm 18a, 18b, 20a, 20b may become a part of the 'FM Framework' 12 system by simply adhering to the 'open interface' 22a, 22b, 24a, 24b of the adaptors 14a, 14b, 16a, 16b associated with the FM Framework 12.

Figure 4:
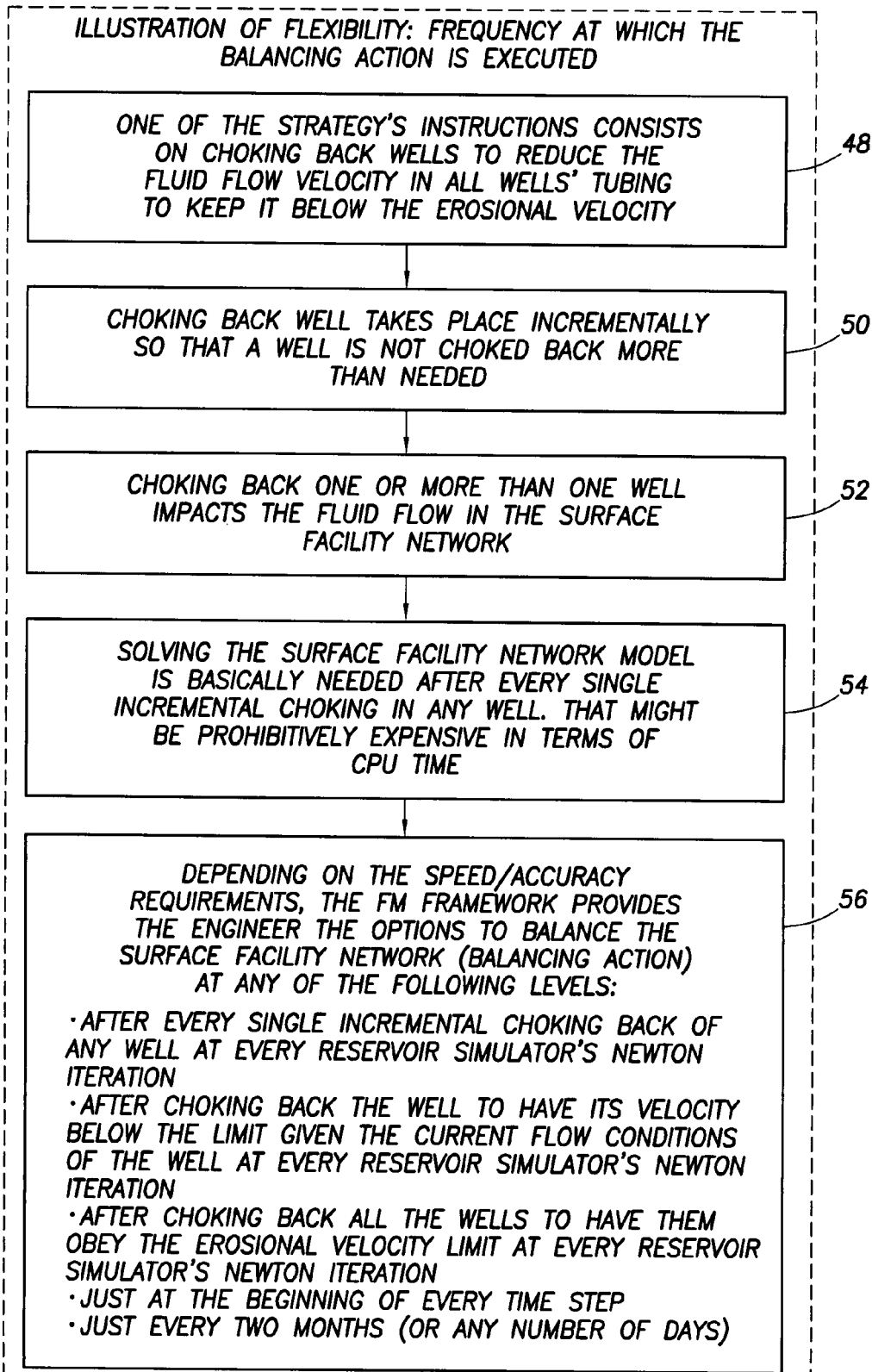
FIG. 4 provides a first illustration of the 'Flexibility' of the FM Framework, the term 'Flexibility' in this first sense reflecting the frequency at which a balancing action is executed by the FM Framework.

In FIG. 4, the 'FM Framework' 12 includes 'adaptors' 14a, 14b, 16a, 16b and an 'open interface' 22a, 22b, 24a, 24b associated with the 'adaptors' wherein other simulators, such as reservoir simulators 18a, 18b and/or a network simulators 20a, 20b, can operatively attach to the 'FM Framework' 12 via the 'open interface' 22a, 22b, 24a, 24b of the adaptors' 14a, 14b, 16a, 16b. As shown in FIG. 14, the 'adaptors' 14a-14b, 16a-16b within the 'FM framework' 12 are designed to hide the specific details of the reservoir/network simulators 18a, 18b, 20a, 20b so that the 'FM Framework' 12 can communicate with these reservoir/network simulators 18a, 18b, 20a, 20b in a generic way. The defined Field Management 'open interface' 22a, 22b, 24a, 24b in FIG. 14 allows 'plug-and-play' architecture for different reservoir/network simulators 18a, 18b, 20a, 20b with different brands, capabilities, and mathematical formulations. This is achieved by publishing only the 'engineering concepts' associated with the 'open interface' 22a, 22b, 24a, 24b of FIG. 14 of the 'adaptors' 14a, 14b, 16a, 16b.

In FIGS. 15 and 17, the published 'engineering concepts' associated with the 'open interface' 22a, 22b, 24a, 24b of the adaptors 14a, 14b, 16a, 16b are illustrated in detail.

In FIG. 15, a set of published 'interface characteristics' or 'engineering concepts' 35 associated specifically with the open interface 22a, 22b with the adaptors 14a, 14b of the 'FMReservoirMgr' node 12a of the FM Framework 12 of FIG. 14 are illustrated. The reservoir simulators 18a, 18b of FIG. 14 can interface directly with the 'FM Framework' 12 by adhering to the published 'interface characteristics' 35 of FIG. 15 associated with the open interface 22a, 22b of the adaptors 14a, 14b of the 'FMReservoirMgr' node 12a of the FM Framework 12 of FIG. 14.

In FIG. 17, a set of published 'interface characteristics' or 'engineering concepts' 37 associated with the open interface 24a, 24b with the adaptors 16a, 16b of the 'NetworkMgr' node 12b of the FM Framework 12 of FIG. 14 are illustrated. The network simulators 20a, 20b of FIG. 14 can interface directly with the 'FM Framework' 12 by adhering to the published 'interface characteristics' 37 of FIG. 17 associated with the open interface 24a, 24b of the adaptors 16a, 16b of the 'NetworkMgr' node 12b of the FM Framework 12 of FIG. 14.

The FM 'open interface' 22a, 22b, 24a, 24b, as shown in FIG. 14, enables more than just 'plug-and-play' architecture. The FM 'open interface' 22a, 22b, 24a, 24b in FIG. 14 helps to decouple 'mathematical concepts' from 'reservoir engineering concepts' thereby allowing the engineer to think only in terms of what matters most for the FM strategy, that is, what is 'real' (for example, wells, completion intervals, fluid streams, etc, are 'real') rather than 'simulation tools' including 'finite-difference grids' and 'well-segments' (which are used to represent what is real). For example, refer to FIG. 16 wherein the underlying representation of a completion interval might change from one reservoir simulation model to another, but the definition/concept of the completion interval remains the same.

Figure 3:
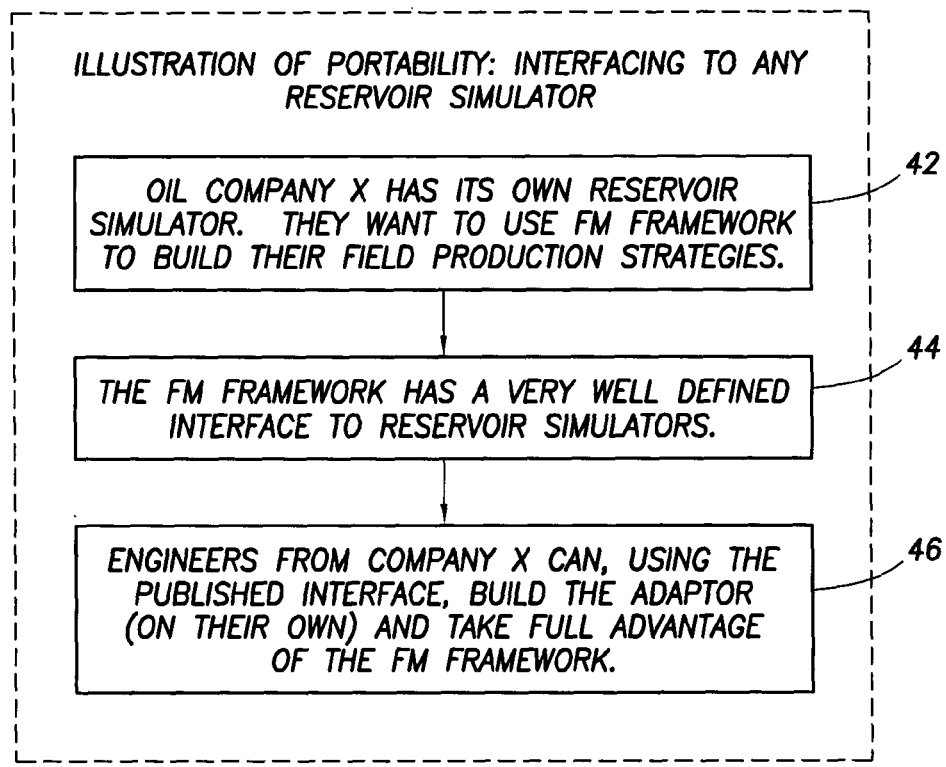
FIG. 3 provides an illustration of the 'Portability" of the FM Framework wherein the FM Framework can be coupled to and then subsequently decoupled from any reservoir or network simulator via the open interface of the adaptors of the FM Framework of FIG. 1.

Referring to FIG. 3, an illustration of the 'Portability' of the FM Framework is shown in the steps 42, 44, and 46 of FIG. 3. The term 'Portability' here refers to the ability of any reservoir simulator 18 or network simulator 20 to interface with the FM Framework 12 via the 'open interface' 22 and 24 of the adaptors 14 and 16 (as shown in FIG. 1). In FIG. 3, assume that a company X has its own reservoir simulator, and they want to use the 'FM Framework' 12 (in FIG. 1) to build their field production strategies, step 42 in FIG. 3. The 'FM Framework' 12 of FIG. 1 has a very well defined 'open interface' 22 and 24 to the reservoir (and network) simulators 18 (and 20), step 44 in FIG. 3. As a result, the engineers from company X can, using the 'published information' pertaining to the 'open interface' 22 and 24 of FIG. 1 (i.e., the aforementioned 'engineering concepts' of the 'open interface'), build an adaptor (on their own) and take full advantage of the 'FM Framework' 12 of FIG. 1, step 46 of FIG. 3.

Flexibility of the FM Framework 12

The 'Flexibility' of the 'FM Framework' 12 can be explained, as follows. The 'FM Framework' 12 enables the user to control the settings of Field Management (FM) strategies allowing for a flexible system that handles conventional cases as well as complicated use cases. That is, the 'FM Framework' 12 allows control over how the 'FM Framework' logic is executed, in order to accommodate real field situations that require such control. The 'FM Framework' 12 flexibility is demonstrated through control of the frequency at which the balancing action is executed, a use by the 'FM framework' 12 of a set of expressions, and a use by the 'FM framework' 12 of dynamic lists of flow entities.

Referring to FIGS. 10, 11, 12, and 13, the 'FM Framework' 12 of FIGS. 1 and 14 is built upon a 'tree structure' of 'nodes', the 'tree structure' of 'nodes' associated with the 'FM Framework' 12 being shown in FIGS. 10, 11, 12, and 13 (to be discussed later in this specification). Part of each of the 'nodes' of the 'FM Framework' 12 of FIGS. 10 through 13 is 'auto-generated' (for example, the 'managers' are 'auto-generated', such as the 'ExpressionMgr', the 'EntityListMgr', etc), and another part of each of the nodes of the 'FM Framework' 12 of FIGS. 10 through 13 is a 'created node' that are case dependent. Under these 'managers' (including the StrategyMgr), nodes can be created (e.g. a strategy under the 'StrategyMgr', an action under the 'ActionMgr', etc).

Figure 10:
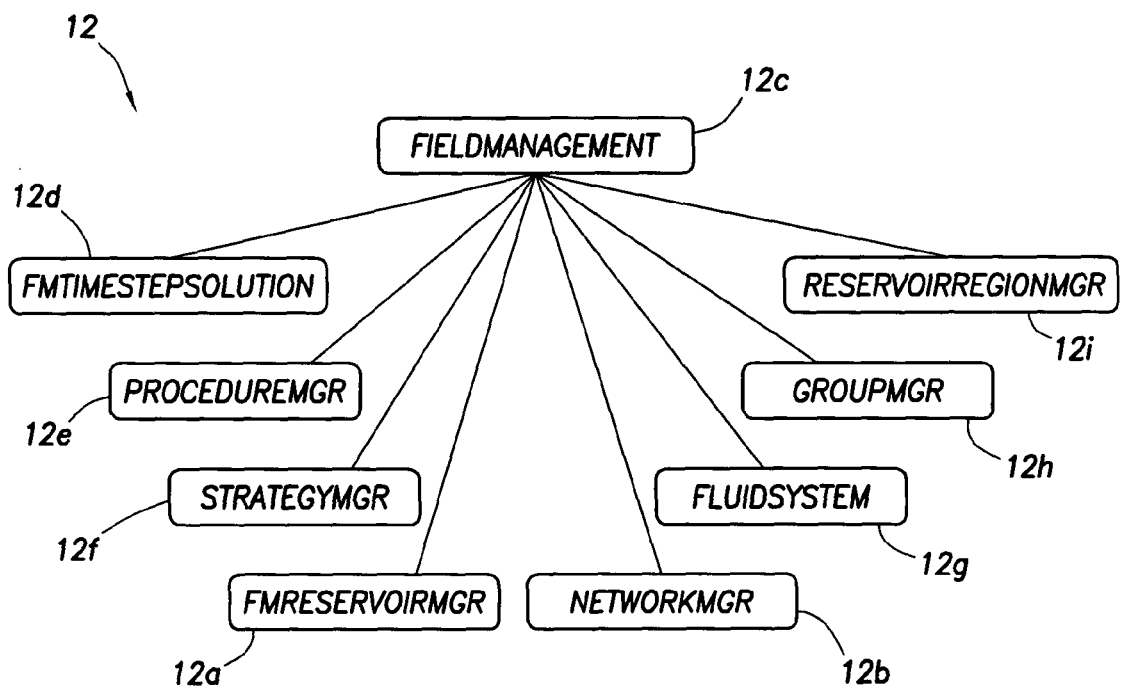
FIG. 10 illustrates a first construction of the FM Framework including a plurality of 'high level nodes' of the FM Framework.
Figure 11:
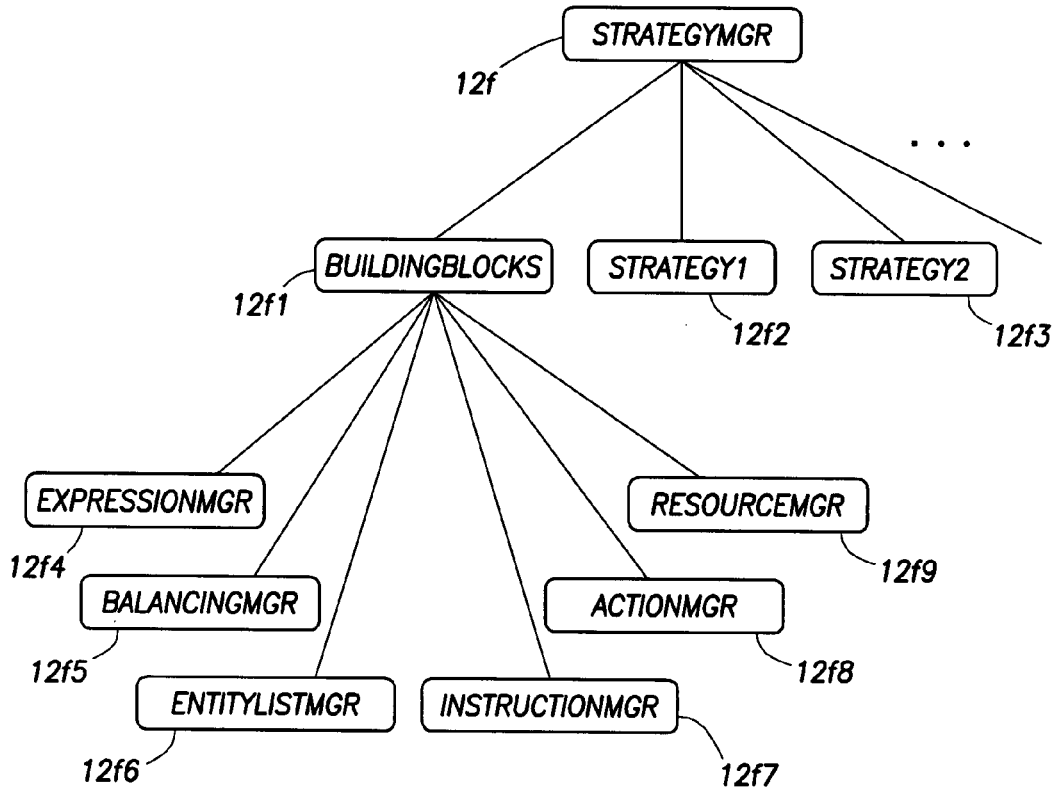
FIG. 11 illustrates a more detailed construction of the 'strategy manager (StrategyMgr)' node of the FM Framework which further illustrates additional building blocks of a Field Management strategy.
Figure 12:
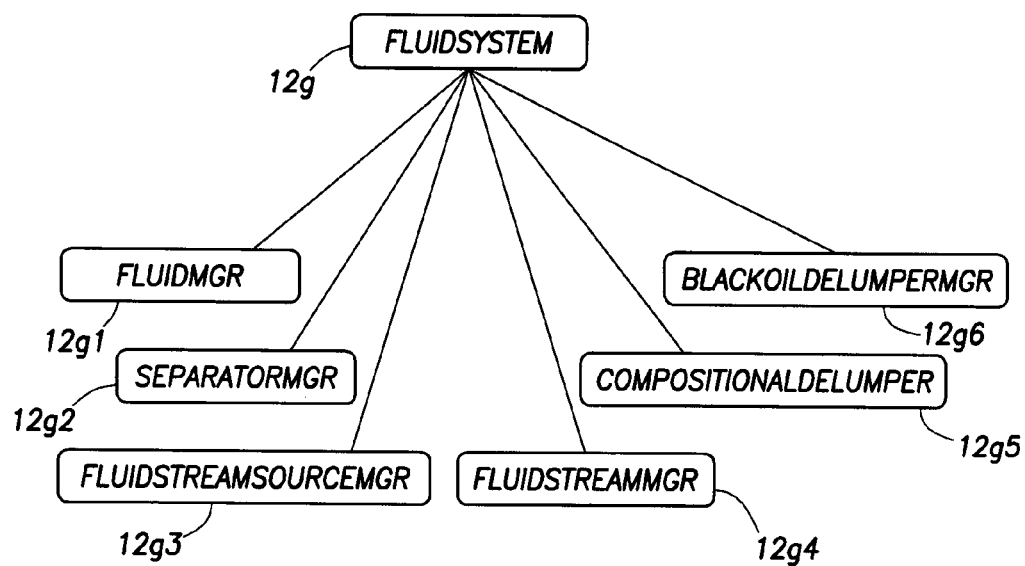
FIG. 12 illustrates a first construction of the 'fluid system (FluidSystem)' node of the FM Framework, which further illustrates an overall view of the 'PVT' related part (i.e., the 'fluid system') of the FM framework.
Figure 13:
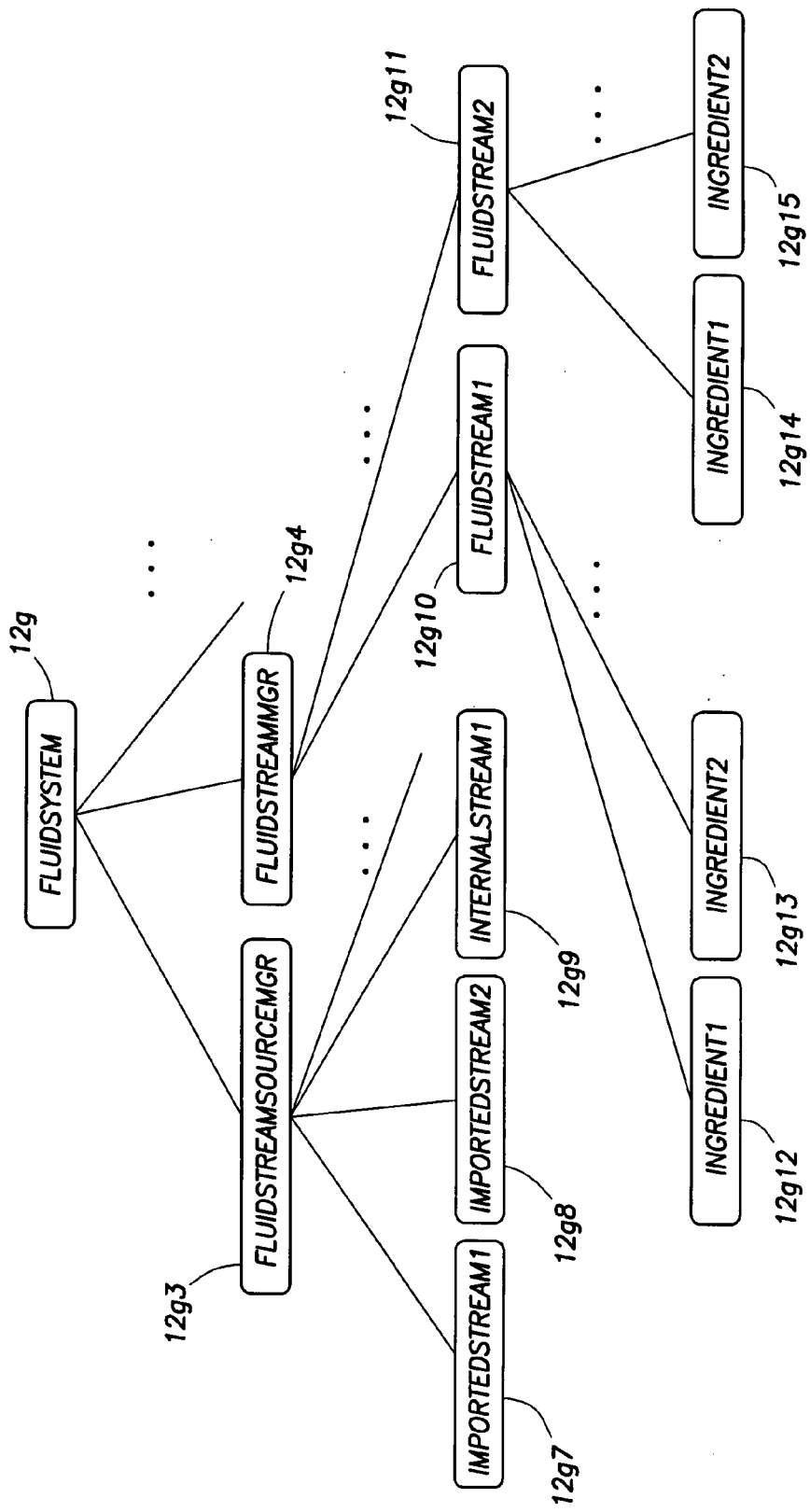
FIG. 13 illustrates a second construction of the 'fluid system (FluidSystem)' node of the FM Framework, which further illustrates the structure details of the fluid streams functionality of the FM Framework.

In FIG. 10, the 'FM Framework' 12 includes a 'plurality of nodes', where the 'plurality of nodes' comprise the 'Field-Management' node 12c of FIG. 14 (which is adapted for practicing the previously discussed steps of FIG. 2 which represent a 'Field Management Strategy' corresponding to a method for 'Field Management' associated with the 'FM Framework' 12 of FIGS. 1 and 14), the 'FMTimeStepSolution' node 12d, the 'ProcedureMgr' node 12e, the 'StrategyMgr' node 12f of FIG. 11, the 'FMReservoirMgr' node 12a of FIG. 14, the 'NetworkMgr' node 12b of FIG. 14, the 'FluidSystem' node 12g of FIGS. 12 and 13, the 'GroupMgr' node 12h, and the 'ReservoirRegionMgr' node 12i.

In FIG. 11, the building blocks of the 'FM Framework' 12 is illustrated, FIG. 11 illustrating a more detailed construction of the 'StrategyMgr' node 12f of FIG. 10. In FIG. 11, the 'StrategyMgr' node 12f is operatively connected to a 'BuildingBlocks' node 12f1, a 'Strategy1' node 12f2, and a 'Strategy2' node 12f3. The 'BuildingBlocks' node 12f1 is operatively connected to the following additional nodes: the 'ExpressioMgr' node 12f4, the 'BalancingMgr' node 12f5, the 'EntityListMgr' node 12f6, the 'InstructionMgr' node 12f7, the 'ActionMgr' node 12f8, and the 'ResourceMgr' node 12f9.

In FIG. 12, an 'overall view of the PVT related part (i.e., the fluid system) of the 'FM Framework' 12' is illustrated, FIG. 12 illustrating a first more detailed construction of the 'FluidSystem' node 12g of FIG. 10. In FIG. 12, the 'FluidSystem' node 12g is operatively connected to the following nodes: the 'FluidMgr' node 12g1, the 'SeparatorMgr' node 12g2, the 'FluidStreamSourceMgr' node 12g3, the 'FluidStreamMgr' 12g4, the 'CompositionalDelumperMgr' node 12g5, and the 'BlackOilDelumperMgr' node 12g6.

In FIG. 13, the structure details of the fluid streams functionality of the 'FM Framework' 12 is illustrated, FIG. 13 illustrating, in more detail, a 'further plurality of additional nodes' which are operatively connected to the 'FluidStreamSourceMgr' node 12g3 and the 'FluidStreamMgr' node 12g4 as shown in FIG. 12. In FIG. 13, the 'further plurality of additional nodes' which are operatively connected to the 'FluidStreamSourceMgr' node 12g3 include: the 'ImportedStream1' node 12g7, the 'ImportedStream2' node 12g8, and the 'InternalStream1' node 12g9. In FIG. 13, the 'further plurality of additional nodes' which are operatively connected to the 'FluidStreamMgr' node 12g4 include: 'FluidStream1' node 12g10 and the 'FluidStream2' node 12g11. In FIG. 13, the 'further plurality of additional nodes' which are operatively connected to the 'FluidStream1' node 12g10 include: the 'Ingredient1' node 12g12 and the 'Ingredient2' node 12g13. In FIG. 13, the 'further plurality of additional nodes' which are operatively connected to the 'FluidStream2' node 12g11 include: the 'Ingredient1' node 12g14 and the 'Ingredient2' nodes 12g15.

Referring to FIGS. 4, 5, and 6, the 'Flexibility' of the 'FM Framework' 12 of FIGS. 1 and 14 is provided at several levels of the FM Framework 12:

1. A flexible strategy execution loop providing full control on the ratio of accuracy over CPU time. See FIG. 2 for the strategy execution loop.
2. A wide set of available 'topology modifying actions' enabling the realization of engineering tasks through multiple scenarios.
3. A wide range of 'expressions' providing a highly rich base for setting constraints/criteria.
4. A wide range of 'flow-entity lists' covering all traditional and advanced engineering needs.
5. A wide range of 'balancing actions' enabling traditional and advanced functionality.

In FIGS. 4, 5, and 6, illustrations of the 'Flexibility' of the 'FM Framework' 12 of FIGS. 1 and 14 are shown in steps 48 through 70 of FIGS. 4, 5, and 6.

In FIG. 4, an illustration of the 'Flexibility' of the 'FM Framework' 12 of FIGS. 1 and 14 reflects the frequency at which a balancing action is executed. Referring back to the steps of FIG. 2 representing a 'Field Management Strategy' corresponding to a method for 'Field Management' associated with the 'FM Framework' 12, in FIG. 4, the following steps represent the 'Flexibility' of the 'FM Framework' 12 in terms of the frequency at which a balancing action is executed: (1) One of the strategy's instructions consists on choking back wells to reduce the fluid flow velocity in all wells' tubing to keep it below the erosional velocity, step 48 of FIG. 4, (2) Choking back the well takes place incrementally so that a well is not choked back more than needed, step 50 of FIG. 4, (3) Choking back one or more than one well, impacts the fluid flow in the surface facility network, step 52 of FIG. 4, (4) Solving the surface facility network model is basically needed after every single incremental choking in any well, which might be prohibitively expensive in terms of CPU time, step 54; in FIG. 4, and (5) Depending on the speed/accuracy requirements, the 'FM framework' 12 provides the engineer the options to balance the surface facility network (balancing action) at any of the following levels: (5a) After every single incremental choking back of any well at every reservoir simulator's Newton iteration, (5b) After choking back the well to have its velocity below the limit given the current flow conditions of the well at every reservoir simulator's Newton iteration, (5c) After choking back all wells to have them obey the erosional velocity limit at every reservoir simulator's Newton iteration, (5d) Just at the beginning of every time step, and (5e) Just every two months, or any number of days, step 56 of FIG. 4.

In FIG. 5, an illustration of the 'Flexibility' of the 'FM Framework' 12 of FIGS. 1 and 14 reflects the use of Expressions. Therefore, in FIG. 5, the following steps represent the 'Flexibility' of the 'FM Framework' 12 in terms of its use of Expressions: (1) When building a strategy for predicting a field future production, the engineer uses the Expressions of the 'FM Framework' 12 of FIGS. 1 and 14 for: (1a) Ordering of entities in building dynamic flow-entity lists, (1b) Selection-criteria for building dynamic list of entities, (1c) Triggering and success-criteria for instructions, (1d) Constraints/objectives for balancing actions, and (1e) Customized Field Management (FM), step 57 of FIG. 5; (2) When building an expression, the engineer can use any property (e.g. production oil rate, reservoir volume gas injection rate, bottom hole pressure, etc.) and any appropriate flow entity status (open, closed, shut, etc.) combined to any appropriate flow entity (well, well list, completions, etc), step 60 of FIG. 5; and (3) Expressions can be as complex as necessary and appropriate (linear, non-linear, etc); Expressions can be nested to use more sophisticated expressions, step 62 of FIG. 5.

In FIG. 6, an illustration of the 'Flexibility' of the 'FM Framework' 12 of FIGS. 1 and 14 reflects its use of Flow Entities. Therefore, in FIG. 6, the following steps represent the 'Flexibility' of the 'FM Framework' 12 in terms of its use of Flow Entities: (1) The engineer wants to build a strategy in which he/she has a field water production limit to obey; He/she decides that the optimal scenario consists on performing the following every time the water production limit is hit: (1a) Select the group of wells that is producing above a predefined water cut, (1b) Select the well in that group that is producing most water, (1c) Select the completion from that well that is producing most water, and (1d) Shut the selected completion, step 64 of FIG. 6; (2) The engineer builds a dynamic list of groups to which only groups with water cut higher the predefined limit belong (membership to the list gets updated every time the list is used); The list, when updated, results on selecting the group that has the highest water cut among all groups that belong to the list, step 66 of FIG. 6; (3) The engineer builds a dynamic list of wells that, when updated, results on the well with the highest water production rate among all the production wells that belong to the selected group, step 68 of FIG. 6; and (4) The engineer builds a dynamic list of well completions that, when updated, results on the completion with the highest water production rate among all the completions of the selected well, step 70 of FIG. 6.

Extensibility of the FM Framework 12

The 'Extensibility' of the 'FM Framework' 12 can be explained, as follows. Custom variables, custom actions, and custom strategies enable the construction of 'extensions' to the 'FM Framework' 12. These 'extensions' enable almost every conceivable use case to be handled by the 'FM Framework' 12. These 'extensions' may be made at run-time on the user's platform, without the need for a development cycle and additional software or hardware, other than that provide through the Field Management (FM) system. These 'extensions' may then be saved and reused for application to multiple cases.

Figure 7:
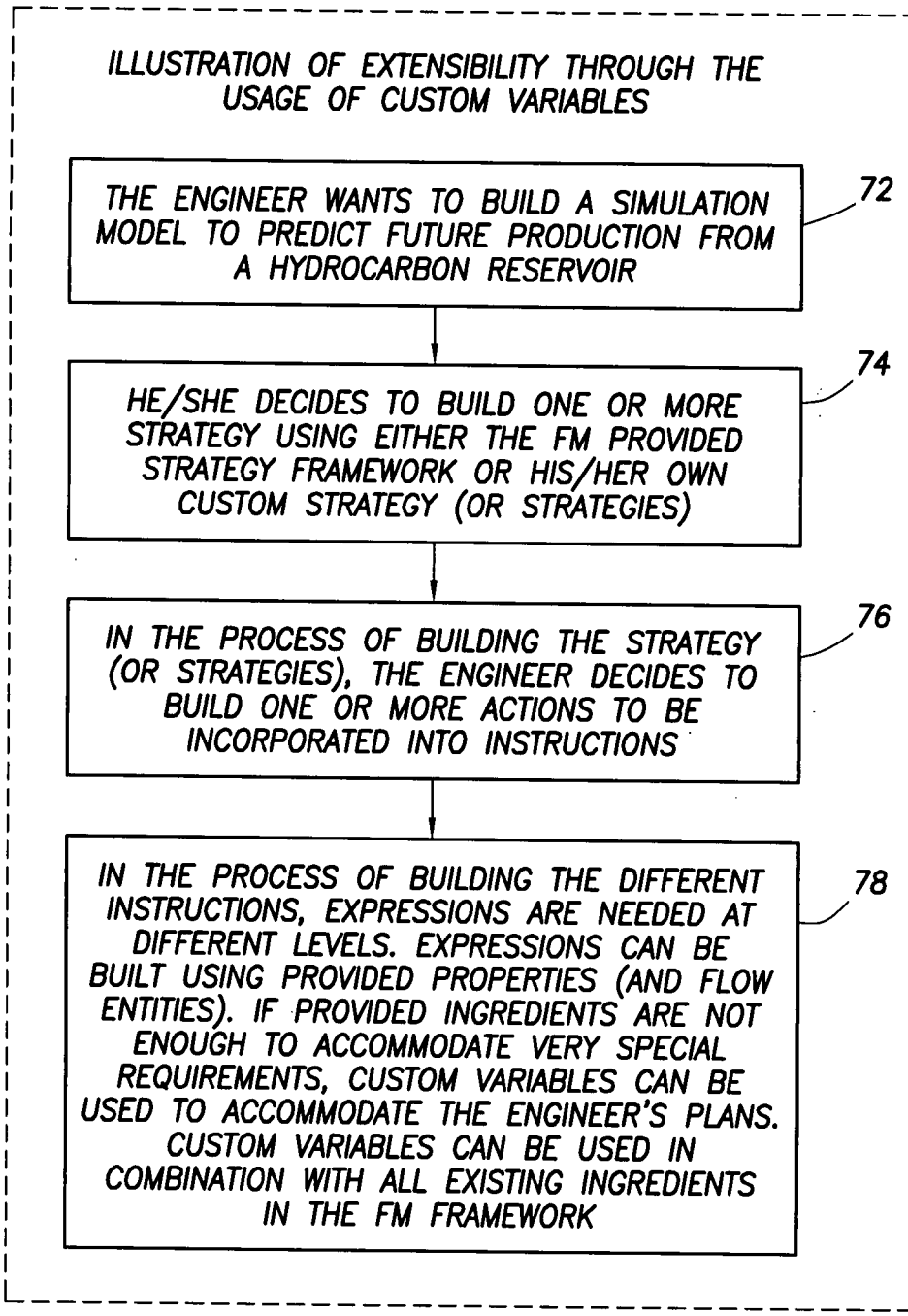
FIG. 7 provides a first illustration of the 'Extensibility' of the FM Framework, the term 'Extensibility' in this first sense reflecting the usage of Custom Variables by the FM Framework.
Figure 8:
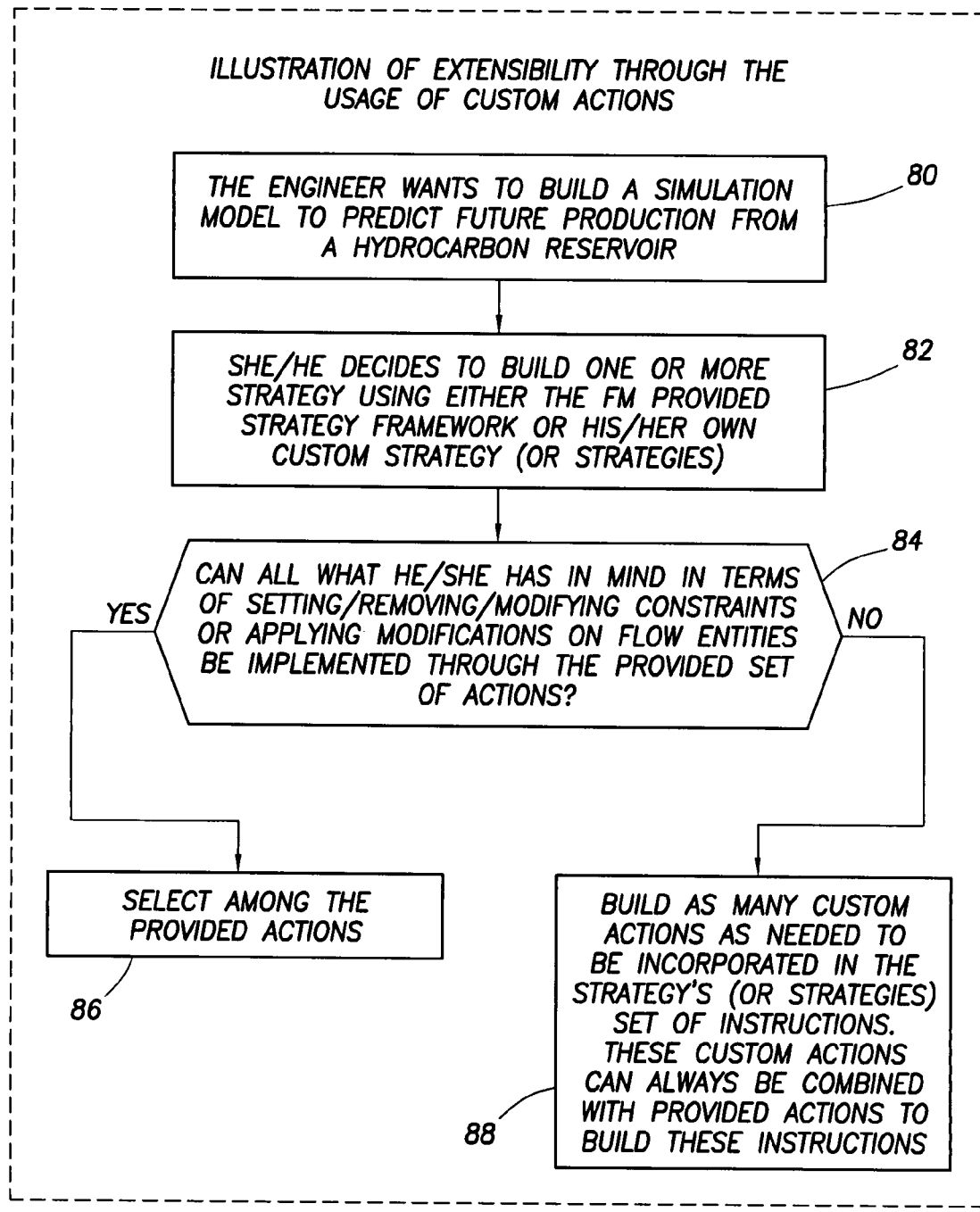
FIG. 8 provides a second illustration of the 'Extensibility' of the FM Framework, the term 'Extensibility' in this second sense reflecting the usage of Custom Actions by the FM Framework.
Figure 9:
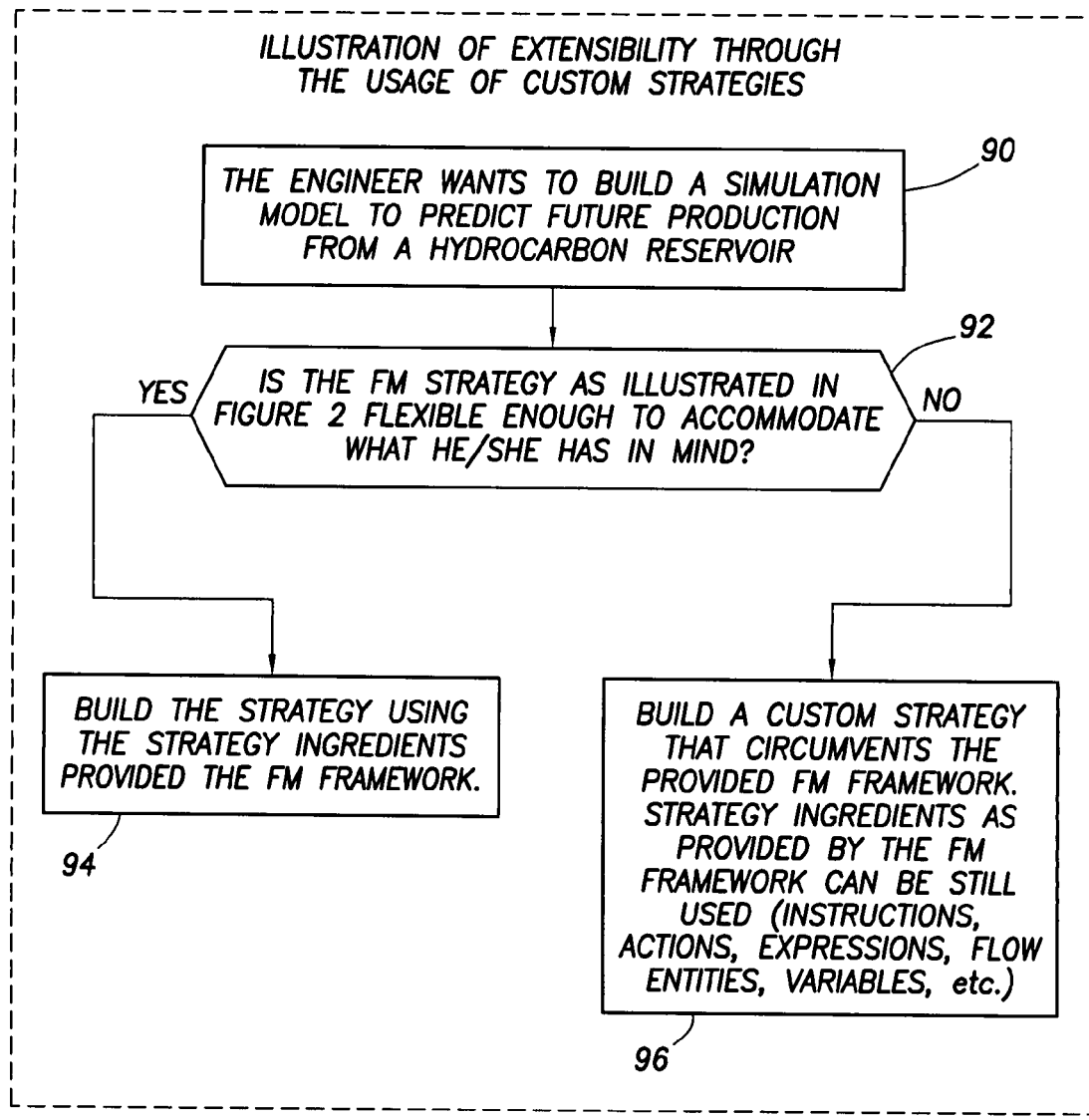
FIG. 9 provides a third illustration of the 'Extensibility' of the FM Framework, the term 'Extensibility' in this third sense reflecting the usage of Custom Strategies by the FM Framework.

Referring to FIGS. 7, 8, and 9, the 'Extensibility' of the 'FM Framework' 12 of FIGS. 1 and 14 is provided at several levels of the FM Framework 12:

1. Custom variables: Custom variables enable the definition of "constants" as well as scripts that calculate a value to be used in an expression. Once created, the custom variables may be used in expressions that in turn may be used as success-criteria, objectives, constraints, etc.
2. Custom actions: Custom actions might be potentially used for the implementation of complex and specific FM processes that cannot be implemented with the provided set of functionality in the FM framework. Custom actions are implemented in the form of a free-form python script.
3. Custom strategies: The custom strategy is another dimension of the extensibility points of the FM framework. Custom strategies should be used when an advanced user wishes to circumvent the provided FM framework altogether and implement their own FM logic by way of free form python scripts.

These extensibility points enable users to incorporate customized workflows at run-time without having to go through any lengthy development cycle, and without needing access to, and have an intricate understanding of, the underlying software and hardware.

In FIGS. 7, 8, and 9, illustrations of the 'Extensibility' of the 'FM Framework' 12 of FIGS. 1 and 14 are shown in steps 72 through 96 of FIGS. 7, 8, and 9.

In FIG. 7, an illustration of the 'Extensiblity' of the 'FM Framework' 12 of FIGS. 1 and 14 reflects the use of Custom Variables. Therefore, in FIG. 7, the following steps represent the 'Extensibility' of the 'FM Framework' 12 in terms of its use Custom Variables: (1) The engineer wants to build a simulation model to predict future production from a hydrocarbon reservoir, step 72 of FIG. 7; (2) He/she decides to build one or more strategies using either the FM provided strategy framework or his/her own custom strategy (or strategies), step 74 of FIG. 7; (3) In the process of building the strategy (or strategies), the engineer decides to build one or more actions to be incorporated into instructions, step 76 of FIG. 7; and (4) In the process of building the different instructions, expressions are needed at different levels; Expressions can be built using provided properties (and flow entities); If provided ingredients are not enough to accommodate very special requirements, custom variables can be used to accommodate the engineer's plans; Custom variables can be used in combination with all existing ingredients in the FM framework, step 78 of FIG. 7.

In FIG. 8, an illustration of the 'Extensibility' of the 'FM Framework' 12 of FIGS. 1 and 14 reflects the use of Custom Actions. Therefore, in FIG. 8, the following steps represent the 'Extensibility' of the 'FM Framework' 12 in terms of its use Custom Actions: (1) The engineer wants to build a simulation model to predict future production from a hydrocarbon reservoir, step 80 of FIG. 8; (2) She/he decides to build one or more strategies using either the FM provided strategy framework or his/her own custom strategy (or strategies); step 82 of FIG. 8; (3) Can all what he/she has in mind in terms of setting/removing/modifying constraints or applying modifications on flow entities be implemented through the provided set of actions (?), step 84 of FIG. 8; (4) If yes, select among the provided actions, step 86 of FIG. 8; and (5) If no, build as many custom actions as needed to be incorporated in the strategy's (or strategies) set of instructions; These custom actions can always be combined with provided actions to build these instructions, step 88 of FIG. 8.

In FIG. 9, an illustration of the 'Extensibility' of the 'FM Framework' 12 of FIGS. 1 and 14 reflects the use of Custom Strategies. Therefore, in FIG. 9, the following steps represent the 'Extensibility' of the 'FM Framework' 12 in terms of its use Custom Strategies: (1) The engineers wants to build a simulation model to predict future production from a hydrocarbon reservoir, step 90 of FIG. 9; (2) Is the FM strategy as illustrated in FIG. 2 flexible enough to accommodate what he/she has in mind (?), step 92 of FIG. 9; (3) If yes, build the strategy using the strategy ingredients provided by the FM framework 12, step 94 of FIG. 9; and (4) If no, build a custom strategy that circumvent the provided FM framework; Strategy ingredients as provided by the FM framework 12 can be still used (instructions, actions, expressions, flow entities, variables, . . . ), step 96 of FIG. 9.

DETAILED DESCRIPTION

The 'FM Framework' 12 of FIGS. 1 and 14 disclosed in this specification is intended for an audience of Field Management (FM) units in oil companies and service companies. The 'FM Framework' disclosed herein is involved in the following workflows:

1. Field development plans
2. Surface facility design.
3. Surface facility de-bottlenecking.
4. Uncertainty analysis.
5. Sensitivity analysis.
6. Instantaneous revenue optimization from the hydrocarbon field.
7. Lifetime revenue optimization from the hydrocarbon field.

Field management (FM) is the simulation workflow through which predictive scenarios are carried out to assist in field development plans, surface facility design/de-bottlenecking, uncertainty/sensitivity analysis, and instantaneous/lifetime revenue optimization from a hydrocarbon field. This involves, among others, the usage of reservoir simulators (18a, 18b of FIG. 14), surface-network simulators (20a, 20b of FIG. 14), process-modeling simulators, and economics packages.

This specification discloses a comprehensive, portable, flexible and extensible FM framework which is completely decoupled from surface and subsurface simulators. The framework has a clearly defined interface for simulators and external FM algorithms. Any black-box simulator or algorithm may become a part of the system by simply adhering to the FM interface, as discussed in this specification.

The FM framework capabilities discussed in this specification are demonstrated on several examples involving diversified production strategies and multiple surface/subsurface simulators. One real field case that requires advanced/complicated development logic is also presented.

As noted earlier, Field management (FM) is the simulation workflow through which predictive scenarios are carried out to assist in field development plans, surface facility design/de-bottlenecking, uncertainty/sensitivity analysis and instantaneous/lifetime revenue optimization from a hydrocarbon field.

Traditionally, the FM functionality has been distributed among the reservoir simulator(s), the network simulator(s) and the "controller" that couples reservoir simulators to surface facility network simulators.[1] The reservoir simulator provides embedded management tools for its subordinate wells. In the case of multiple reservoirs and surface facility networks, the controller manages the boundary-conditions exchange needed to couple different models and potentially tops-up with some global management tools that account for the coupling of the different models. The different models involved in the coupled scheme might have substantially different FM capabilities and approaches. Potential overlap and conflict might arise between the local single reservoir management tools and the global FM tools.

As a consequence of the relative isolation of the different simulators, the resulting FM plans/scenarios are generally suboptimal and tightly integrated to the specific simulators used in the workflow.[2]

Furthermore, since the FM functionality is basically independent of the simulators' brand, the details of the physics being modeled, and the mathematical approaches utilized in these simulators, the usage of independent and unified FM framework provides a new horizon of powerful tools enabling the emerging smart field workflows.

This specification presents a comprehensive set of tools, algorithms and frameworks (referred to with FM or FM framework in the following parts of this specification), enabling a management of the functionality required by most conventional fields.

Extensibility and flexibility of Field Management (FM) also allow(s) workflows and logic that are difficult/impossible to implement within the prescribed set of functionality traditionally provided in reservoir/FM tools. This specification presents an innovative approach for extensibility and flexibility providing many previously unavailable possibilities for advanced FM users.

The following parts of this specification are presented in the following sequence:
  The FM framework and its different building-blocks.
  Details of the FM framework building-blocks:
    Flow-entities and flow-entity lists.
    Expressions.
    Actions.
    Instructions.
    Balancing.
    Strategies.
    Procedures.
    Fluid system.
  FM adaptors to reservoir simulators and surface-network simulators enabling the abstraction of the implementation details and a plug-and-play architecture.
  Multiple reservoir simulations and surface-network models coupling.
  Customized FM enabling extensibility of functionality beyond that supplied by the FM framework.
  Interactive FM.
  Examples The FM Framework and Its Different Building-Blocks Referring to FIG. 2, Field Management (FM) comprises executing, at a prescribed frequency (i.e. solution method), a strategy; as depicted in FIG. 2. The terminology used in this section is fully described in following sections. Here, we illustrate the overall picture of the FM framework 12 presented in this specification.

The concepts in Field Management (FM) are:
  Strategy: Encapsulates a list of instructions and an optional balancing action. One might construct several strategies to be executed at different times of a simulation run; only one strategy is active at one time.
  Instruction: Ties a list of actions to a triggering-criterion. Actions are executed in the attempt to meet the instruction's success-criterion (i.e. desired well/group/field operating condition).
  Action: Encapsulates commands resulting in modifications of one or more flow-entities. There are two categories of actions:
    Topology modifying action: Modifies the state of flow-entities (e.g. open a well, close a completion interval) or changes "boundary conditions" (e.g. add a new flow rate constraint to a well).
    Balancing action: Allocates rates (e.g. by optimization, surface-network balancing, or heuristic group control) to existing flow-entities without modifying any of the flow-entities' states.

Referring to FIG. 10, the FM framework/functionality is built upon a tree structure (of nodes). FIG. 10 shows the high level part of this structure. The nodes in the tree-structure are fully described in the following sections.

Referring to FIG. 11, one main node in FIG. 10 is the 'strategy manager' as illustrated in FIG. 11. FIG. 11 shows an "auto-generated" part of nodes (the managers, e.g. ExpressionMgr, EntityListMgr, etc), and created nodes (that are case dependent). Under these managers (including the StrategyMgr), nodes can be created (e.g. a strategy under the StrategyMgr, an action under the ActionMgr, etc).

Solution Method (Frequency)

Two types of solution methods are available (see Refs. 1 to 3 identified below for full details):

Iteratively lagged: The strategy is executed at the beginning of up to a prescribed number of Newton iterations of the reservoir simulator time step.

Periodic: The strategy is executed at the beginning of each synchronized time step. A periodic solution generally results in a faster solution (in terms of CPU) due to:

The time saved by not solving the strategy as frequently as the iteratively lagged method.

The boundary conditions of the reservoir model changing less frequently, allowing convergence at a higher rate (fewer Newton iterations per time step).

However, the gained computational speed in the case of periodic solution is, generally, at the expense of accuracy. This is especially true in the case of:

Substantial reservoir conditions changes during the synchronized time step.

Wells operating at their potential rate. The potential might significantly change during the time step due to the change in the reservoir pressure (especially in the near-wellbore region).

FM Framework

In the following, we present the different building-blocks involved in an FM strategy. More basic building-blocks are presented first.

Flow-Entities and Flow-Entity Lists

The FM logic is built upon flow-entities. The following are examples of available flow-entities:

Completion intervals (this is the lower level entity)
Wells.
Groups.
Surface-network nodes.
Surface-network branches.
Surface-network branch devices (e.g. chokes).
Static flow-entity lists.
Dynamic flow-entity lists.
Well managers.
Reservoir Regions.
Reservoirs.
Reservoir managers.

Some of the above flow-entities encapsulate other entities; in other words, they contain a lists of other entities:

| Entity | Is a flow-entity list of |
| --- | --- |
| Well | Completion intervals |
| Group | Wells, groups |
| Static flow-entity list | Unrestricted (any of the above flow-entities) |
| Dynamic flow-entity list | Unrestricted (any of the above flow-entities) |
| Well manager | Wells (all the wells in one reservoir model) |
| Reservoir manager | Reservoirs |

Flow-entities are one of the building-blocks of an expression as described later on in this specification.

Most of the actions within the FM framework act on flow-entity lists as detailed in this specification to meet an instruction's success-criterion. There are three main types of flow-entity lists:

Groups

A group is a collection of wells and/or groups. Group hierarchies may also be built, representing real hierarchies in the field (e.g. representing manifolds) or virtual hierarchies (e.g. best performing wells). Groups may be overlapping, i.e., one well/group may be under multiple groups. Group level injection stream hierarchies may also be associated with groups.

Static Flow-Entity Lists

Members of these lists do not change in time, unless explicitly modified. Static flow-entity lists may contain any type of flow-entities, including other static flow-entity lists.

Dynamic Flow-Entity Lists

Membership and order of dynamic flow-entity lists are reevaluated whenever the list is used. This means that the members of a dynamic list might change over time as field conditions change. Example of dynamic flow-entity lists:

All the un-drilled wells with oil potential rate of higher than 1500 STB/D ordered in decreasing potential water rate.

All the producers with a gas-to-oil ratio (GOR) higher than 7.0 Mscf/STB, and oil rate lower than 300 STB/D.

All network branches with an erosional-velocity ratio higher than 0.9.

Dynamic flow-entity lists may also be nested within each other; in other words, one dynamic list may provide the initial list of another dynamic list. There are no limits to the level of nesting. Nested dynamic lists enable the construction of lists such as:

The well with the highest GOR within the group with the highest gas production.

The completion intervals that produce with the highest water-cut in the well that produces with the highest water rate.

Expression

Expressions may be used across FM for several purposes:
Ordering of entities in building dynamic flow-entity lists.
Selection-criteria for building dynamic list of entities.
Triggering and success-criteria for instructions.
Constraints/objectives for balancing actions.
Customized FM.

All properties (e.g. production oil rate, reservoir volume gas injection rate, bottom hole pressure, etc.) may be used to create numerical or logical expressions. States may also be used to create logical expressions. Examples of states that might be used in building expressions:

Well/completion interval flow status (e.g. open or closed).

Well/completion interval closure reason (e.g. a well that is shut because of production capacity excess).

Well/completion interval closure status (e.g. a well that is shut at the surface, as opposed to shut at the bottom hole).

Well type (e.g. producer, injector).

There are also several functions that may be used in expressions (sum, mean, harmonic mean, skewness, standard deviation, etc.). These functions will be executed at the point where the expression is evaluated. This allows flexible expressions that may be used to construct useful dynamic lists such as the list of wells that produce below the field average, or in expressions used as triggering-criteria.

Expressions are categorized into assigned and logical expressions:

Assigned Expressions

These are expressions that are tied to one or more flow-entities. Assigned expressions can be numerical (when evaluated, results in a real number) or logical (when evaluated, results in a Boolean). Assigned expressions may be combined with other assigned expressions to form nested expressions. The following are some usage examples of assigned logical expressions:

Triggering-criterion of an instruction. Example: Group G1's potential production oil rate is less than 20,000 STB/D or Group G1's production oil rate is less than 15,000 STB/D.

Success-criterion of an instruction.

Constraints of a balancing action (optimization, heuristic group control). Example: The field's reservoir volume gas injection rate equals the field's reservoir volume production rate minus the field's reservoir volume water injection rate (voidage replacement with gas as a top-up phase).

Free Expressions

Free expressions are not assigned to a flow-entity. They must be assigned to a flow-entity before they may be evaluated. These can be numerical or logical. The following are some usage examples of free expressions:

Selection-criteria of dynamic flow-entity lists. Example: All the producers that are shut because of production capacity excess providing that these producers have a potential GOR less than 2.0.

Ordering-criteria for dynamic flow-entity lists. Example: Order the selected wells in a dynamic flow-entity list so that higher potential oil production rate wells are first in the list.

Action

Actions are the FM components that encapsulate a logic that generates one or more primitive commands that modify the system. Actions are divided into two main categories:

Balancing action (discussed below in a separate section).

Topology modifying actions. These mainly have a flow-entity list to act on in the attempt to fix the instruction's success-criterion (i.e. desired well/group/field operating condition). In doing so, they result in one or more of the following:

Setting/modifying/removing constraints from flow-entities (e.g. well or a surface-network branch).

Modifying flow status of flow-entities (e.g. open/close a well or a completion interval).

Modification of the type of a well (e.g. turning a producer into an injector).

Modifying a device setting (e.g. incrementally decrease the choke diameter of a wellhead choke to keep the erosional velocity of a well-tubing within tolerance).

It is also possible to encapsulate an instruction in an action, hence enabling composite actions with their own triggering/success-criteria and nested instructions. Modifying existing instructions is also enabled through a specific instruction-modifying action. It is also possible to extend the list of available actions at run-time by way of custom actions as discussed later in this specification.

Instruction

The instruction attempts to fix a success-criterion by applying a list of actions. Fixing the success-criterion means making it evaluate to True.

The success-criterion is a logical expression assigned to one or more flow-entities. Most of the time the criterion that triggers an instruction is what is being fixed. For instance, if the trigger criterion is the field water rate is greater or equal to 5000, the instruction is deemed successful when the applied actions bring the field water rate below 5000. In other words, the success-criterion corresponding to a triggering-criterion is most often the logical negation of the triggering-criterion. However, this is not always the case; one might want to have a success-criterion independent of the triggering-criterion. For instance, instead of working over wells in the field to obey the water rate limit of 5000 STB/D, one might want to bring it down to 4000 STB/D so that the water rate will not exceed 5000 STB/D in the next time-step, requiring yet another workover (such frequent workovers may not be practical). Furthermore, the success-criterion might contain conditions that do not necessarily exist in the trigger criterion. If no trigger criterion is specified, then the instruction will be executed unconditionally.

The actions in the action list are executed in the order they are defined. The instruction will cease executing actions as soon as the success-criterion of the instruction evaluates to True. Note that the check for success is done with a prescribed frequency (after every single topology-modifying command, for instance).

Every instruction has a balancing action that may or may not be the same as the strategy's balancing action. Here again, the instruction's balancing action is executed with a prescribed frequency. Ideally, the balancing action should be executed after every topology modifying command. However, that might be computationally very expensive (e.g. in the case of network balancing). A compromise would be to balance after every action in the instruction's list of actions, or after the last executed action (where the success-criterion of the instruction is met).

One may, optionally, set instructions to be executed a second time within the strategy's instruction list, in case later instructions have disturbed the instruction's success-criterion. One may also set an instruction to be executed a single time; in which case it will be removed from the strategy's list of instruction once executed (e.g. a re-tube action instruction may be allowed only once).

Executing the instruction's list of actions might fail to meet the instruction's success-criterion. In such a case, one may set an instruction to be reverted, so that all actions are undone. Undoing actions is carried out as follows:

Recording the primitive commands that modify the system, e.g.:
1. Open well W1.
2. Set constraint on well W2.
3. Close well W3.

Negating, reversing the order of, and replaying the recorded commands, e.g.:
1. Open W3
2. Remove constraint from W2.
3. Close W1.

Balancing

Balancing is an important concept in FM. It consists of allocating well flow rates so that limits/targets that are specified on wells or lists of wells (e.g. groups) are obeyed/met. Balancing does not involve opening/closing wells and/or completion intervals; it, rather, adjusts well flow rates. In practice, results of a balancing could be implemented by adjusting the wells choke settings, and without installing any additional equipment.

Examples of Balancing Actions:

Heuristic group control: Group constraints (production and injection/re-injection group targets and limits) are apportioned among subordinate wells/groups according to the well/group guide rates. Example: apportion the field's oil production target among subordinate wells so that wells will produce proportionally to their potential oil production rate.

Optimization: Rate allocation based on solving an optimization system with an objective and a list of constraints.[7]

Network balancing: iterative process consists on solving a surface-network model based on the boundary conditions from the wells (and inversely) to converge towards the operational conditions of the wells/network.[1]

A field-wide balancing action may be applied at the FM strategy level. This causes all instructions in the strategy to use this balancing action. The balancing action is executed once at the beginning of the strategy execution loop and, potentially, after every topology modifying action as discussed above.

Strategy

Strategy is the focal point of the FM framework. A strategy encapsulates a list of instructions and an optional field-wide balancing action. The instructions are executed in the order they are specified.

The general approach in FM is that, the desired field operating targets and limits (on the whole field, sets of wells, reservoir regions, completion intervals, etc) are honored by a combination of a field balancing action and topology modifying actions.

Balancing actions work within the potentials of the wells. When these potentials are not within the desired ranges, balancing actions may not be able to honor some of the targets. Also when there are targets and limits, there may come a point where the reservoir/well properties become unfavourable (e.g. wells with high WCT) such that the target and limit cannot be satisfied simultaneously. In these cases, topology-modifying actions could be used to increase field/well potentials (e.g. drill new wells) and/or reduce unfavourable reservoir/well properties (e.g. workover high WCT).

In short the general approach presented by the FM framework is:

Given a list of operating conditions for the field, try to honor them all by a balancing action.

Resort to topology modifying actions (specified in instructions) only when the balancing process fails to honor all the operating conditions.

This makes practical sense in most cases; why resort to drastic (and expensive) measures (like drilling wells) when we are able to operate within the desired targets and limits with the current hardware (i.e. topology) installed in the field? When the current hardware fails to honor all the desired targets and limits (i.e. the balancing action fails to honor some of the targets/limits), we resort to topology modifying actions (in the form of instructions that have topology modifying actions in their action lists).

Here is a simple demonstration of the proposed general approach. Suppose we would like to operate the field with the following target and limits:

Field oil rate target of 20000 STB/D: this might be a contractual agreement.

Field water rate limit of 12500 STB/D: this might be a facility limit.

Field gas rate limit of 100000 Mscf/D: this might be an engineering preference.

We could set up a balancing action that would provide us the well-by-well allocation that honors all these desired field operating conditions. However there might come a point in simulation time, when the model is no longer able to deliver 20000 STB/D of oil with the existing wells. In this case we would need to drill new wells; we could easily set up an instruction to do this.

Similarly, even when there are enough wells in the model to deliver the oil target, there might not be a well-by-well allocation that produced 20000 STB/D of oil and less than 12500 STB/D of water at the same time. This might easily happen if all the wells in the model have high WCT, perhaps due to aquifer encroachment or injection water breaking through. To fix this situation, one could easily set up an instruction to shut wells with high WCT, or alternatively, workover the completion intervals with high WCT.

Procedures

Procedures provide a simple way of defining simple FM operations. They automatically set up expressions, dynamic flow-entity lists, actions and instructions requiring minimal user-provided information and relying on reasonable defaults. Procedures are very much like wizards found in some applications; in this case the procedures are tailored for FM. The user may choose to override the default settings of a procedure or modify what has been set up.

Procedures provide high level FM workflows. Constraint handling procedures are one instance. Some example applications of constraint handling procedures are:

Economic limits: shutting wells or completion intervals to obey production limits.

Group production rules: opening completion intervals, retubing wells or lowering their pressure limits, to maintain production capacity.

Prioritization rate allocation: opening wells, in a specific order, to meet a production target.

The procedure's role is to modify the system in order to obey a well or a group constraint. This can be achieved through several methods including:

Opening wells or completion intervals to meet a target.

Closing wells or completion intervals to obey a limit.

Plugging completion intervals to obey a limit.

Retubing wells to enhance a well's productivity.

Modifying wells pressure limits.

The procedure's main product is an instruction for which the success-criterion corresponds to the constraint being obeyed.

Fluid System

Referring to FIG. 12, FIG. 12 illustrates an overall view of PVT related part (fluid system) of the FM Framework 12, that is, the FM framework for PVT related functionality. In FIG. 12, a fluid-models manager and separators manager provide the fundamentals of the PVT calculations and fluid needs. Any fluid requirement in FM (e.g. gas injection/re-injection, fuel, sale, etc.) needs to be provided through fluid stream sources that are ingredients to build fluid streams. Furthermore, the FM framework provides the capability of converting fluid streams from coupled models with different fluid descriptions into a unified set of components.

Fluid Stream Sources

Fluid stream sources are defined independently of their usage. Fluid stream sources might be:

Imported: they have a fluid rate availability limiting the amount of fluid (of a given phase) available for fluid stream usage. The fluid has a prescribed composition.

Internal: they mainly represent a hydrocarbon fluid phase resulting from a separator stage tied to a flow-entity (e.g. well, group, network node, etc).

Fluid stream sources are used for two main purposes:

Source of fluid stream ingredients for the purpose of building fluid streams. A fluid stream source may be used in more than one ingredient to contribute to several fluid streams. If the fluid stream source has limited fluid availability, fluid streams with higher priority are served first.

To represent satellite groups by adding an internal fluid stream source to a group in a group tree hierarchy (for heuristic group control, for instance).

Fluid Streams

Fluid streams manage the fluid requirements in FM. Examples of fluid requirements: fuel gas, sale gas, and gas injection/re-injection.

Referring to FIG. 13, this FIG. 13 illustrates the structure details of the fluid streams functionality of the FM Framework 12. In FIG. 13, a fluid stream consists of one or more fluid stream ingredients. It has a target rate that may or may not be met according to the ingredients' availability as depicted in FIG. 13. A fluid stream ingredient uses a fluid stream source (as shown in FIG. 13). It has a target rate/fraction from a predefined fluid stream. One or more fluid stream ingredients might use the same fluid stream source. For instance, both fuel gas and re-injected gas streams might consist of ingredients sharing the same fluid stream source (e.g. the gas from the second separator-stage at the FIELD group).

Fluid streams have priorities. In the case of multiple fluid streams with limited fluid availability from their corresponding fluid stream sources, the higher priority streams will be served first.

Given the set of fluid stream sources, the calculated properties of the fluid stream are:
  Available rate, which is limited by the target rate (depending on availability and priority).
  Composition.

Example 1

Inject 100 MMscf/D of gas in group G1. Use the following fluid stream ingredients in the prescribed order to make up the stream's target rate. Some of the ingredients may not be needed to make up the rate.
  0.2*(the gas production of group G2 from separator stage 3).
  0.2*(the gas production of group G5 from separator stage 2).
  0.8*(the gas production of group G3 from separator stage 2).
  5000 MMscf/D from an imported source with a prescribed composition.
  The remainder comes from another imported source (unlimited) with a prescribed composition.

Example 2

Inject 100 MMscf/D of gas in group G1. The gas is provided from the following fluid stream ingredients:
  0.2*100 from the gas production of group G2 (from separator stage 3).
  0.2*100 from the gas production of group G5 (from separator stage 2).
  0.3*100 from the gas production of group G3 (from separator stage 2).
  0.2*100 from an imported source (unlimited) with a prescribed composition.
  0.1*100 from another imported source (unlimited) with a prescribed composition.

Lumping/Delumping

FM might be set to use any prescribed fluid description. The reservoir and network models might be using different fluid descriptions. An 'on the fly' lumping/delumping functionality converts, when needed, a fluid stream from one model to another (e.g. delumping a blackoil stream from a reservoir model to the FM set of 11 components and pseudo-components). Details of lumping/delumping in the context of FM with multiple reservoirs coupled to surface facility networks are discussed in Ref 4 below.

Adaptors

Referring to FIGS. 14, 15, and 17, referring initially to FIG. 14, adaptors (14a, 14b, 16a, 16b) within the FM Framework 12 are layers to hide the specific details of reservoir/network simulators so that FM communicates with these simulators in a generic way. The defined FM interface allows plug-and-play architecture for different reservoir/network simulators with different brands, capabilities and mathematical formulations. This is achieved by publishing only the 'engineering concepts' associated with the FM interface (22a, 22b, 24a, 24b); see FIGS. 15 and 17 for the published 'engineering concepts' associated with the FM interface (22a, 22b, 24a, 24b).

The FM interface enables more than just plug-and-play architecture. It helps decouple mathematical concepts from reservoir engineering concepts, allowing the engineer to think only in terms of what matters most for the FM strategy, in other words, what is real (e.g. wells, completion intervals, fluid streams, etc) rather than simulation tools used to represent what is real (e.g. finite-difference grids, well-segments, etc).

Reservoir Simulator Adaptors

Referring to FIG. 15, a reservoir simulator adaptor to the FM framework is an interface that hides all the simulation details of wells or completion intervals and exposes only engineering-relevant concepts of these entities. A tree structure of a reservoir simulator's adaptor is presented in FIG. 15.

A reservoir engineer that uses the reservoir simulation model ("using" as opposed to "constructing" the model) to carry out predictive scenarios might not be interested in the underlying mathematical details. For instance the number of cells in the finite-difference model is irrelevant from the FM point of view. Similarly, the details of grid-cell to well-node connections concern only the constructor of the model and not the user. The user of the model is concerned only with the engineering concepts (e.g. completion intervals).

Decoupling mathematical- and implementation-specific details from purely engineering concepts has numerous advantages. Consider the implementation specific concept of grid-cell to well-node connections for a finite-difference reservoir simulator and the engineering concept of completion intervals. A completion interval is defined (universally) by the following information:
  Well trajectory.
  Start depth on this trajectory.
  End depth on this trajectory.

In the case of a finite-difference based reservoir simulator with a specific well-model, the reservoir simulator is coupled to the well-model through grid-cell to well-node connections. These mathematical details of how a well-node is connected to a grid-cell are irrelevant for a reservoir engineer who wants to use the reservoir simulation model to investigate the following:
  Performance of the completion interval, i.e. production/injection rates, etc.
  Ability to control the completion interval, i.e. carry out workovers, stimulation, etc.

In the FM framework 12, the reservoir engineer implements his/her FM intentions (FM strategy) through the FM interface that is purely based on engineering concepts. Changes to the reservoir simulation model might occur in time, for instance as new data comes in or when new computational power becomes available:
  Grid-cell to well-node connection properties might change.
  Grid-size and the number of connections might change (e.g. through scale-up or local/global grid refining).

Referring to FIG. 16, the definition of a completion interval however, remains the same as illustrated in FIG. 16; therefore the reservoir engineer's implementation of the FM strategy remains exactly the same. This is true even for more radical changes to the simulation model such as:
- Different well-model is used.
- Different brand of simulator is used.
- Radically different formulation is used (e.g. stream-lines or analytical models)

The same principle applies to the other concepts presented in the FM framework, such as wells and fluid streams.

In summary:
- The reservoir engineer implements a single FM strategy purely based on engineering concepts.
- The strategy may then be used to drive different kinds of underlying models.
- The reservoir engineer will not have to change the FM strategy when a change occurs to the underlying model.

Surface-Network Simulators

Referring to FIG. 17, similar to a reservoir simulator adaptor, a surface-network model adaptor provides an interface that is independent of the specifics of the network simulator. This enables the usage/control of different surface-network models (e.g. of different brands) with the same FM strategy. A tree structure of a surface-network simulator's adaptor is presented in FIG. 17.

Multiple Simulators

FM can control multiple reservoir/surface simulators in a session. These simulators may have the same or different brands, they may run on the same or different machines, and they may operate on the same or different operating systems (OS). Despite this heterogeneity in the simulator brands, OS, etc., the system looks like an integrated system to the reservoir engineer. The software logistics that make this possible are hidden away in the adaptors, enabling the reservoir engineer to focus on what is most important for her/his task.

The presentation of an integrated system enables the reservoir engineer to define the FM strategy that encompasses multiple models. For instance one could easily construct an optimization problem that allocates rates across several reservoir models, or a workover process that utilizes the same rig across completion intervals in wells defined in different simulators.

Customized FM

The FM framework may be customized through several FM extensibility features:
- Custom variables.
- Custom actions.
- Custom strategies.

These extensibility points are implemented in the form of a free-form python script. Python is an interpreted programming language created by Guido van Rossum in 1990. Python is fully dynamically typed and uses automatic memory management. It also has strong object-oriented capabilities. Python is developed as an open source project, managed by the non-profit Python Software Foundation, and is available for free.[5]

The python scripts used within the FM framework extensibility points have access to all the python language functionality and the standard libraries that comes with python. Naturally, the basic language functionality of arithmetics, conditionals, loops, functions, classes and modules are available. The standard python libraries provide further functionality encompassing a wide range of topics, from simple file 10 to complicated remoting frameworks, mathematical toolboxes, etc. In addition an FM toolbox that provides reservoir-engineering specific algorithms and tools is made available. The custom python script also has access to all the entities that are defined in all the coupled models (wells, groups, surface-network nodes, etc).

These extensibility points pave the way for all kinds of real-case and research implementations; the possibilities are endless. These extensibility points are discussed below with some potential example applications.

Custom Variables

Custom variables enable the definition of:
- Constants.
- Scripts that calculate a value to be used in an expression.

Once created, the custom variables may be used in expressions that, in turn, may be used as success-criteria, objectives, constraints, etc. The following are examples of the usage of custom variables:
- Custom variables that are used as the weights of oil and gas production in the objective function of LP optimization balance. The values of these custom variables are provided through a web-service that publishes oil and gas prices.
- A custom variable that gets the group targets and limits from a database or a spreadsheet.

Custom Action

Custom actions are another extensibility point of the FM framework. They might be potentially used for the implementation of complex and customized FM processes that cannot be implemented with the provided actions in the FM framework. Similarly to the other extensibility points, custom actions are implemented in the form of a free-form python script. The following are examples of the usage of custom actions:
- A custom action can be used in order to implement a new empirical correlation to model the effects of a well stimulation job. This custom action may then be used within an instruction, for instance, to improve the productivity/injectivity of wells with low rate potential.
- A custom, balancing action that employs different solvers, e.g. nonlinear and/or evolutionary allocation optimizers.

Custom Strategy

The custom strategy is another level of the extensibility features of the FM framework. The custom strategy can be used when an advanced user wishes to circumvent the provided FM framework altogether and implement their own FM logic by way of free-form python scripts. The following are examples of the usage of custom strategies:
- A custom strategy that completely takes over the control of all controllable entities in the system in order to research a new FM framework.
- A custom strategy that implements the latest/greatest in-house management strategy.

Interactive FM

FM provides the capability of interaction with the simulator in real-time. In other words, once the model has initialized and is ready to time-step, the reservoir engineer may query rates and pressures form the wells and completion intervals, change states of flow-entities, construct groups, etc., all in real simulation time. The reservoir engineer may also construct optimization or heuristic group control allocation problems, even complete FM strategies, and see their effects at once. The reservoir engineer may also instruct the simulators to time-step to a target time, and then resume the dynamic interaction.

The basic means of dynamically interacting with simulators in FM is through the python interpreter. The python interpreter provides an environment that is very similar to that of MATLAB[6]. A MATLAB-like environment with calculation and plotting capabilities, coupled with live, queriable reservoir simulators opens the door for many new potential applications. Some potential usages of dynamic interaction with the simulators are:

Quick check of performance of groups, wells, completion intervals to find out potential bottlenecks.

Testing the FM strategies in real-time before embarking on huge prediction runs.

Research environment to quickly try-out new algorithms.

Teaching environment to spread the knowledge on reservoir/surface simulation.

EXAMPLE APPLICATIONS

In the following sections we present three examples (including a field case) illustrating some of the capabilities of the FM framework presented in this paper. These examples are run using three reservoir simulator brands:

Simulators I and II are used in Example I.
Simulator III is used in Examples II and III.

Example I

Surface Facility Network Coupling

This example serves as a validation of the current framework. The results obtained with the presented FM framework are compared to previously published results.[2] In Ref. 2, part of the FM logic is incorporated in the reservoir simulator and the other part in a "controller". In the current paper, the entire FM logic is unified in the FM framework.

Figure 18:
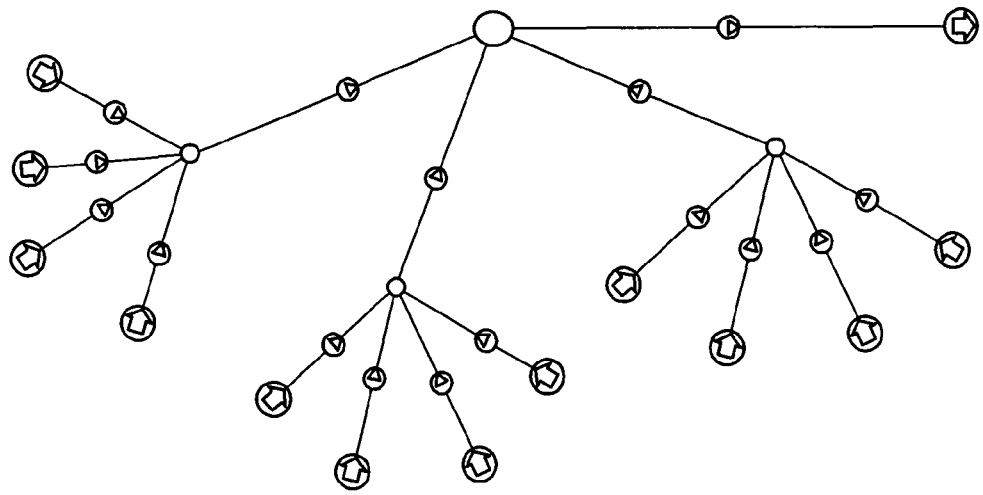
FIG. 18 illustrates a drawing associated with Example I: Surface-network configuration.

Referring to FIG. 18, a black oil reservoir model is coupled to a network model at the tubing head (see FIG. 18). Three wells are initially open: PA1, PB1, and PC1 (one well from each platform). The remaining wells are placed in a drilling queue to be opened as needed, in a prescribed order, to keep the overall oil production rate above 10,000 STB/D.

The following actions are constructed:

A1: Coupling to a surface-network: two reservoir simulator brands are alternatively used for the purpose. The FM logic applied in the example is independent of the subsurface simulator brand. This is implemented using a network balancing action.

A2: Opening wells (closed for capacity excess reasons) when needed to keep the overall production rate above 10,000 STB/D. This is implemented using a topology modifying action.

A3: Incrementally choking back well tubing head to keep erosional velocity ratios (EVR) within tolerance in certain branches of the surface-networks (well risers). This is implemented using a topology modifying action.

A4: Apply economic limits to dynamically shut producers whenever one of the following criteria is met:
Minimum oil production rate of 500 STB/D.
A maximum WCT of 0.7.
A maximum GOR of 4.0.
This is implemented using a topology modifying action.

A5: 80% water injection voidage replacement scheme. This is implemented using a heuristic group control balancing action.

The instructions incorporating A2 (I2) gets triggered whenever the field production rate falls below the prescribed target. The instructions incorporating A3 (I3) and A4 (I4) have no triggering-criteria. All flow-entities meeting the selection-criteria of corresponding dynamic flow-entity lists get processed. Whenever one of these three instructions is executed, Action A1 gets applied since any of the modifications done by these actions require, in principal, the network to be balanced. The balancing action A5 is incorporated in a separate instruction (I5).

The set of instructions is executed in the following order at the beginning of each time step: I4, I2, I3 and then I5. The time step is restricted to a maximum of 30 days.

Figure 19:
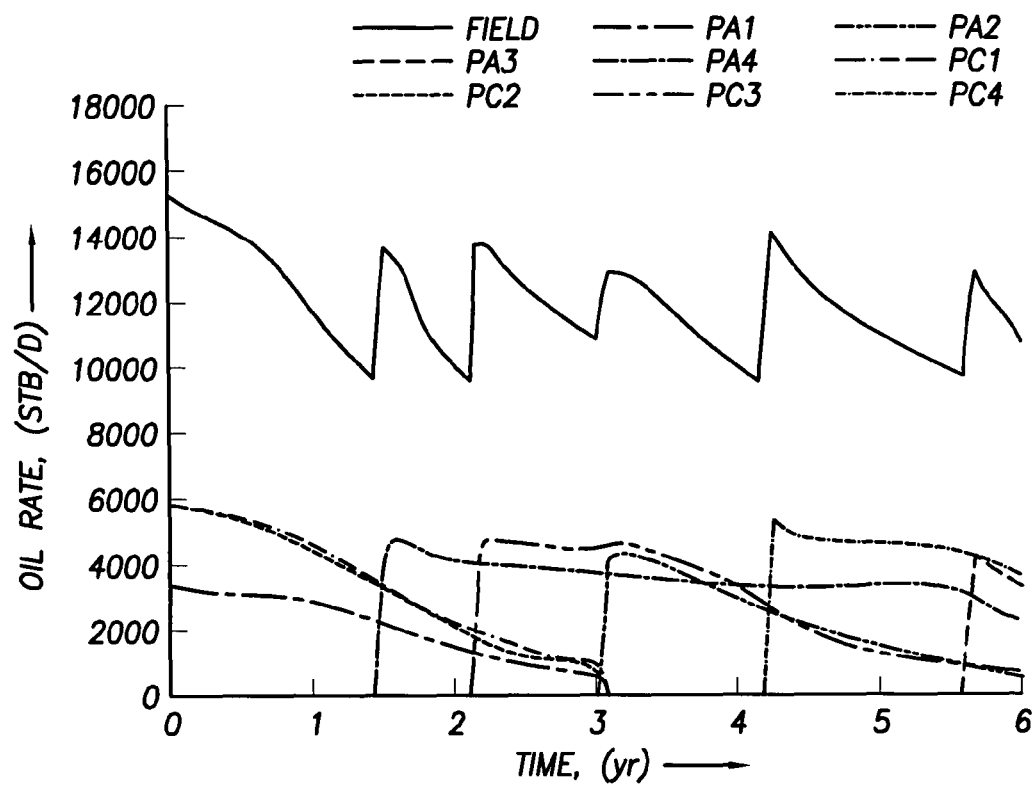
FIG. 19 illustrates a drawings associated with Example I: Field oil rate as well as the wells' oil rate vs. production time.
Figure 20:
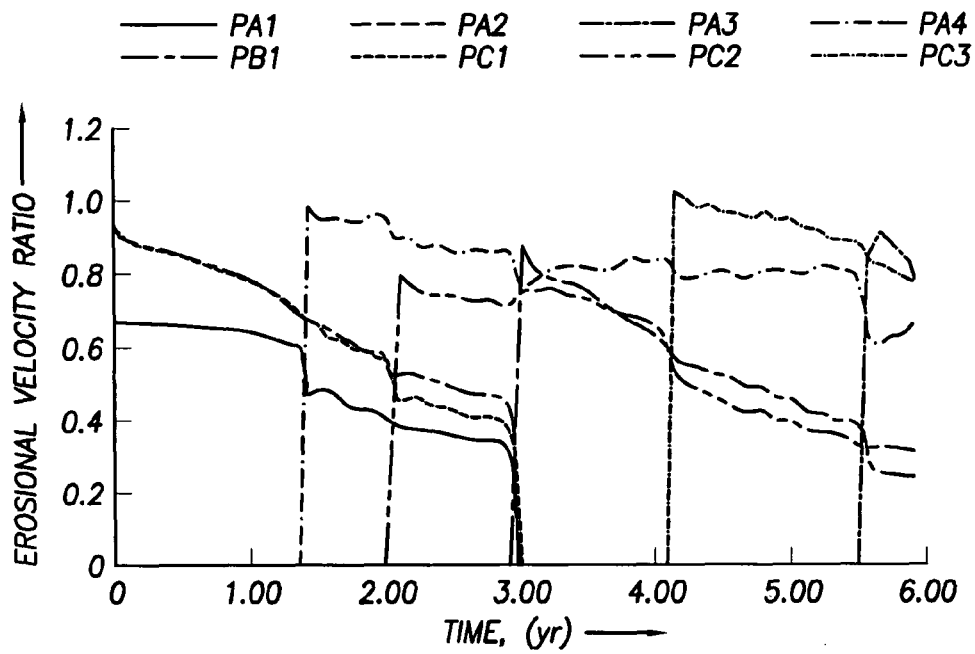
FIG. 20 illustrates a drawing associated with Example I: Erosional velocity ratios in the risers vs. production time.
Figure 21:
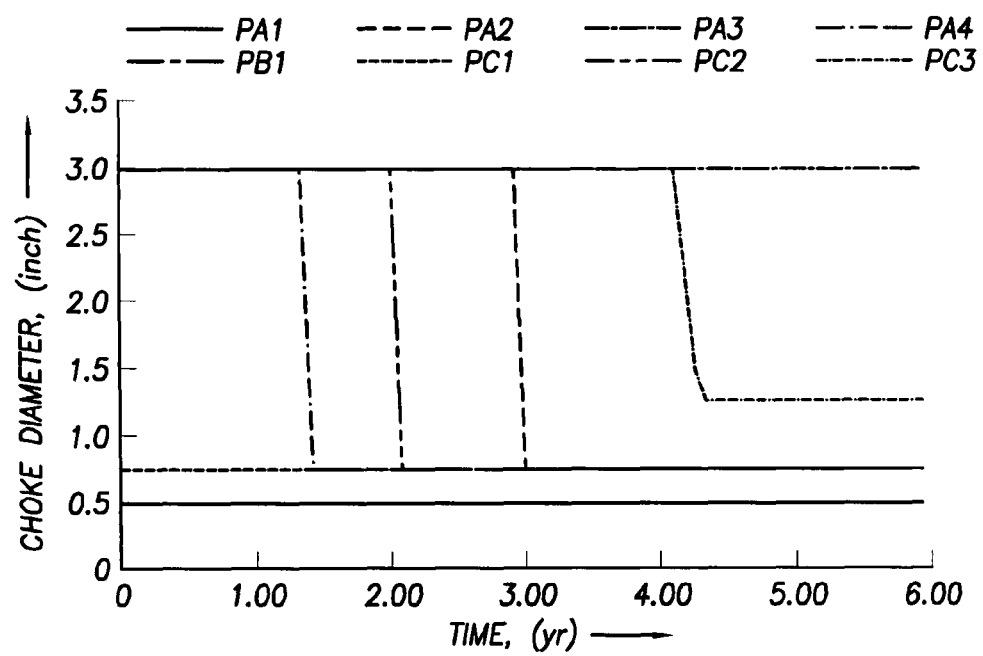
FIG. 21 illustrates a drawing associated with Example I: Well tubing head choke diameters vs. production time.
Figure 22:
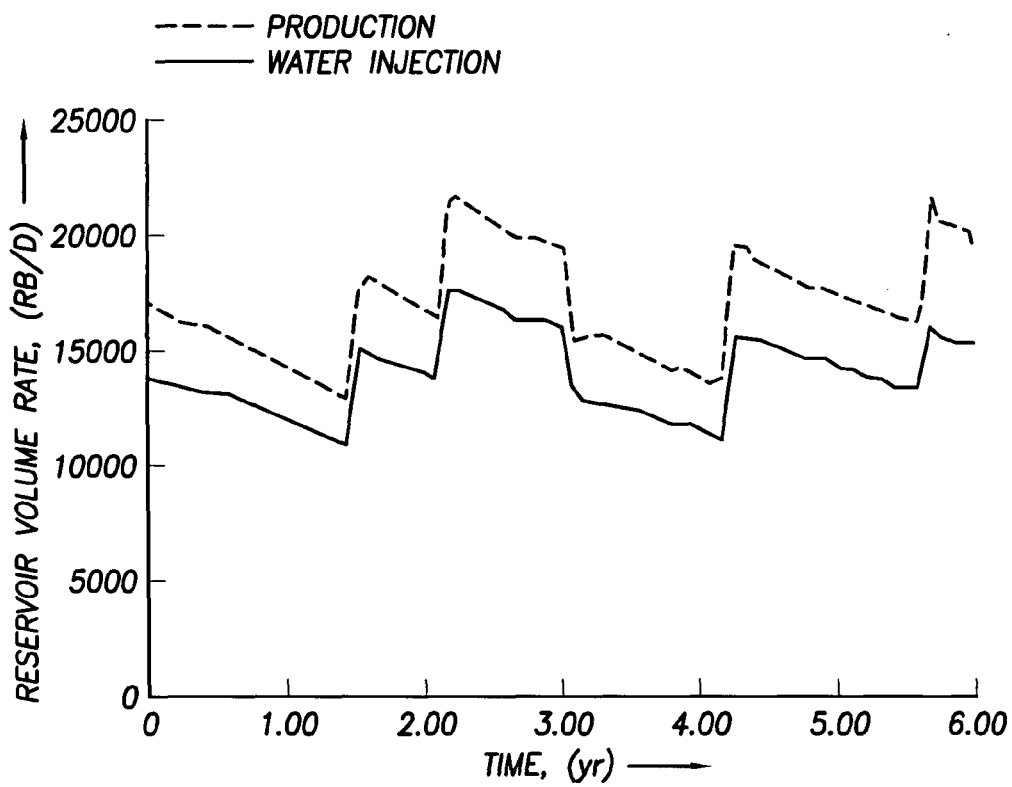
FIG. 22 illustrates a drawing associated with Example I: Field reservoir volume production rate and reservoir volume water injection rate vs. production time.

Referring to FIGS. 19, 20, 21, and 22, details of this example's results are provided in Ref. 2. Here, we briefly describe the results for completeness. FIG. 19 presents the field oil rate vs. time. Whenever the oil rate falls below the prescribed target, a new well is brought up to production. As shown in this figure, only three wells are open at the beginning. These three wells get shut at the end of the third production year because of their WCT hitting the economic limit applied using action A4. Wells have, initially, higher potential than what is shown in this figure. However, the initial EVR of these wells' risers is higher than the prescribed tolerance. Therefore, the choke diameter at the well tubing head is dynamically decremented (0.25 inch each decrement) to decrease the flow rate through these pipes in order to bring the erosional velocity ratio within tolerance. FIG. 20 depicts the well head choke diameter for different wells. The resulting erosional velocity ratio vs. production time for these wells is shown in FIG. 21. FIG. 22 shows the field's reservoir volume production rate as well as the reservoir volume water injection rate as applied by the heuristic group control action A5.

Example II

Field Case

Figure 23:
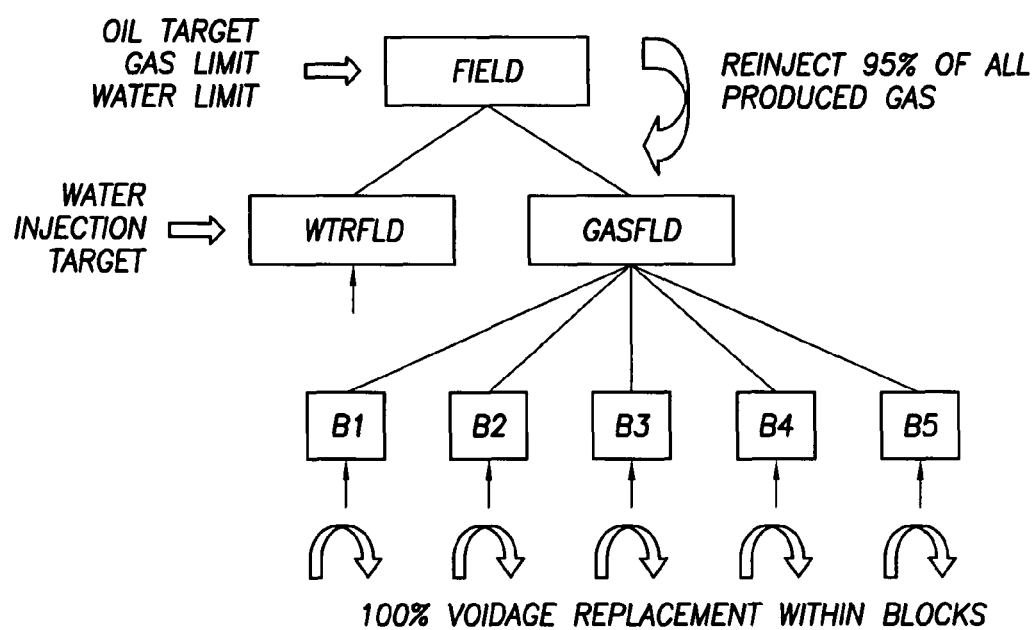
FIG. 23 illustrates a drawing associated with Example II: Illustration of the desired operating conditions.

This field-case has the following desired operating conditions:
Contractual field oil target.
Gas facility limit.
Water facility limit.
Gas-flare restrictions:
No market for gas.
Need to re-inject.
Voidage replacement requirements in five individual blocks Referring, to FIG. 23, the desired operating conditions are illustrated in FIG. 23. Note that most of these constraints are related to each other. In other words, changing the well rates to meet one of these operating conditions, affects one or more of the rest of the operating criteria. For instance, if we changed gas injection rate of an injector well in Block B1 to meet the 100% voidage replacement constraint within that block, we would also be changing the gas re-injection percentage of the field.

The currently operational reservoir model utilizes the conventional if-then logic of conditions and actions in the effort to bring the operating conditions of the model to the desired state. The conventional logic has 15 sequential steps:

1. Choke back wells to constant (a) reservoir volume
   Block B1
   Order by decreasing GOR
2. Repeat step 1 for Block B2
3. Repeat step 1 for Block B3
4. Repeat step 1 for Block B4
5. Repeat step 1 for Block B5
6. Choke back wells to constant (b) reservoir volume
   Group GASFLD
   Order by decreasing GOR
7. Choke back wells to field oil target
   Group FIELD
   Order by increasing GOR
8. Choke back wells to field gas limit
   Group FIELD
   Order by decreasing GOR 9. Choke back wells to field water limit
    Group FIELD
    Order by decreasing water-cut
10. Adjust gas injection rates to match produced reservoir volume
    Block B1
    Allocate by injection potential
11. Repeat step 10 for Block B2
12. Repeat step 10 for Block B3
13. Repeat step 10 for Block B4
14. Repeat step 10 for Block B5
15. Adjust water injection to match field injection target
    Group WTRFLD
    Allocate by injection potential The ad-hoc constants a and b used in this sequential logic were determined by several sensitivity runs made to find out the magnitudes of reservoir volumes producible from and injectable into the reservoir. It is not easy to come up with the values of these constants that result in the best allocation for the field. In addition, this sequential approach is not suitable for handling the inter-dependencies of the constraints. These 15 steps lead to a suboptimal solution and not all constraints are met.

Alternatively, this problem may be posed as an optimization problem. Problem setup becomes much easier and we no longer need the sensitivity runs and the ad-hoc constants, making the simulation workflow much more straightforward. The desired field operating conditions are met by employing a field-allocation optimization algorithm based on Mixed Integer Programming. The optimization problem is defined by the following objective and constraints:

Objective:
    maximize oil
    minimize gas
Constraints
    field oil target
    field gas limit
    field water limit
    field water injection limit
    field gas re-injection constraint (95%)
    Block B1 voidage replacement constraint (100%)
    Block B2 voidage replacement constraint (100%)
    Block B3 voidage replacement constraint (100%)
    Block B4 voidage replacement constraint (100%)
    Block B5 voidage replacement constraint (100%)

The allocation resulting from this optimization system satisfies all these constraints hence results in the desired operating strategy.

Figure 24:
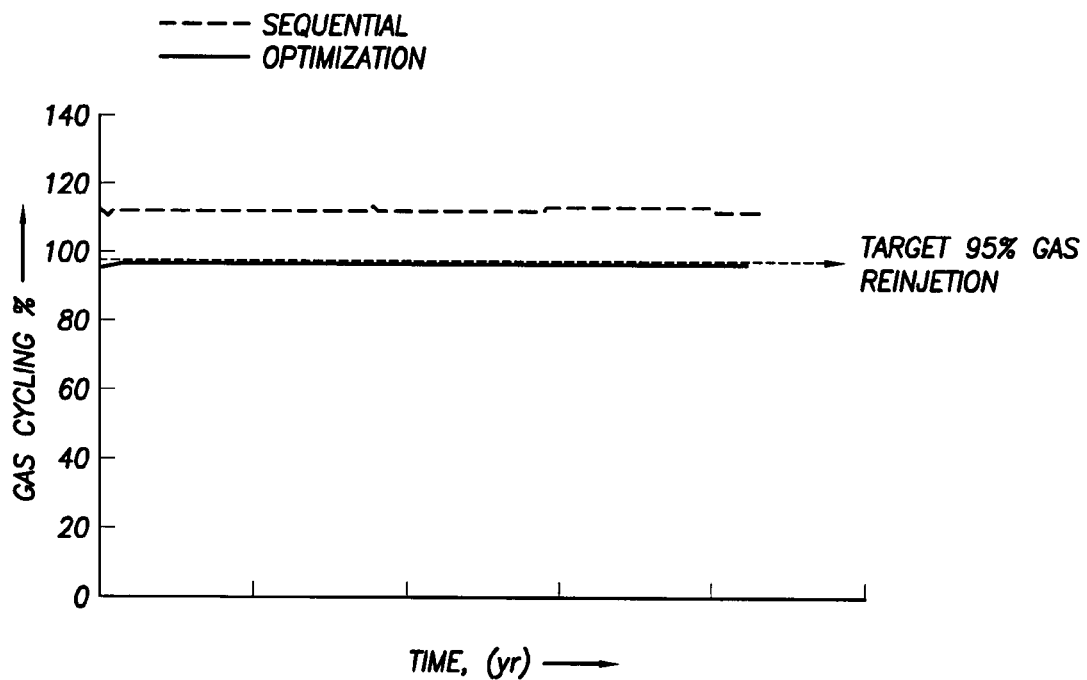
FIG. 24 illustrates a drawing associated with Example II: Comparison of the desired target gas re-injection constraint percentage (95%) with ones obtained with the conventional/sequential approach and optimization.

Referring to FIG. 24, the 95% gas re-injection constraint cannot be met with the conventional/sequential logic, while it is honoured perfectly with the optimizer as can be seen in FIG. 24. The 95% re-injection constraint cannot be honoured by the conventional logic because the sequential approach is not able to accurately capture and evaluate the dependencies of the operating constraints imposed by the reservoir engineer.

The sequential logic results in a gas re-injection percentage of about 111%. This means that 11% more gas is injected than is being produced. However, in reality, there is no source of external gas, hence the results of the sequential logic does not reflect the actual situation in the field. Moreover, since the model injects more gas than is actually available, the rates and the pressures in the prediction diverge from reality as the simulation progresses. The optimized allocation has none of these restrictions.

Example III

Demonstration of Extensibility

This example demonstrates the extensibility of the FM framework. A user-input prediction of oil prices in the future will be used as a weighing factor of oil production rate within the objective of an optimization problem that is set up to maximize the cash-flow obtained from the field at a given time.

An optimization problem is set up as follows:
Objective
    Maximize cash-flow given by $f(t) \times q_o^{Field}$, where $f(t)$ is the predicted price of oil at simulation time t, and $q_o^{Field}$ is the field oil rate.
Constraints
    Field gas limit (8000 Mscf/D).
    Field water limit (150 STB/D).

All the functionality, except the means to define a customized oil price prediction, is available in the Field Management framework. To add this extra functionality, the reservoir engineer sets up f(t) in the form of a time versus oil price table and creates a custom variable in the form of a function that returns the value of the oil price and takes the simulation time as the argument. The engineer then uses this custom variable within the objective expression. This setup will basically result in an optimization problem with a changing objective (based on f(t)) being solved at every time step. All of this is done at run-time on the user's platform, without the need for the vendor to add this additional functionality through a lengthy development cycle.

Figure 25:
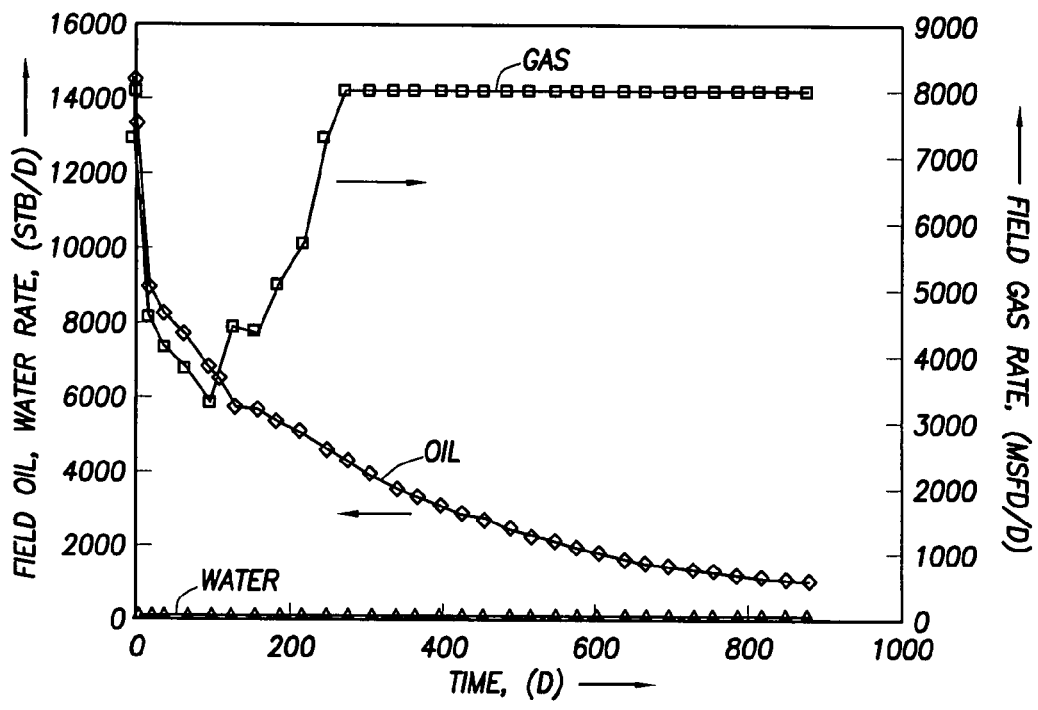
FIG. 25 illustrates a drawing associated with Example III: Field rate profile resulting from cash-flow optimization with varying oil price.
Figure 26:
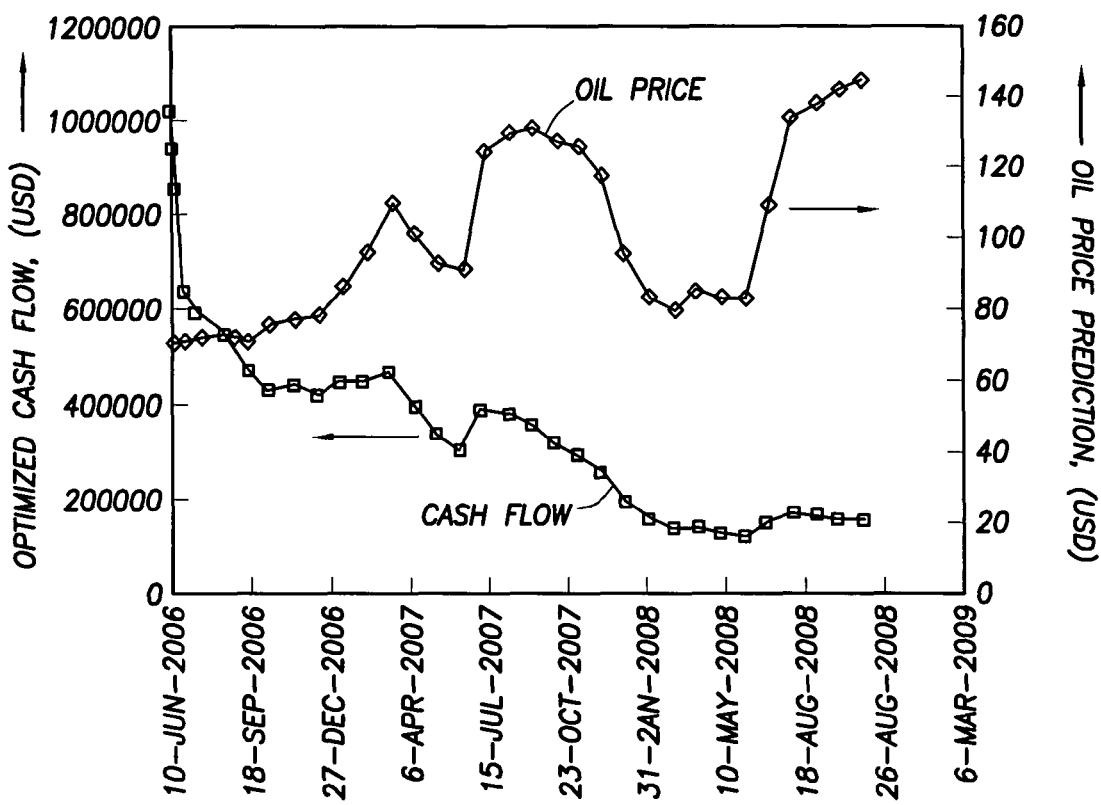
FIG. 26 illustrates a drawing associated with Example III: Oil price prediction used and the optimized cash-flow profile.

Referring to FIGS. 25 and 26, the case is a simple synthetic case with four producers and one water injector. At every timestep, the optimizer finds the optimal allocation that maximizes the cash-flow, and also honors the operating constraints. The resulting rates profile is given in FIG. 25. The oil price predictions used and the optimized cash-flow are given in FIG. 26.

Therefore, a 'Field Management framework' 12 of FIGS. 1 and 14 is presented with the following features:
    Comprehensive functionality: The presented framework provides a wide range of features capable of handling many of the real-world cases. A field case with complex Field Management logic is presented as a demonstration.
    Extensibility: In cases where the presented framework does not have the functionality essential to a specific case, customization can be performed at different levels to help the reservoir engineer implement the exact desired strategy.
    Portability: the FM logic is unified and can be applied to any simulator provided that the simulator is equipped with the necessary interface.

Figure 27:
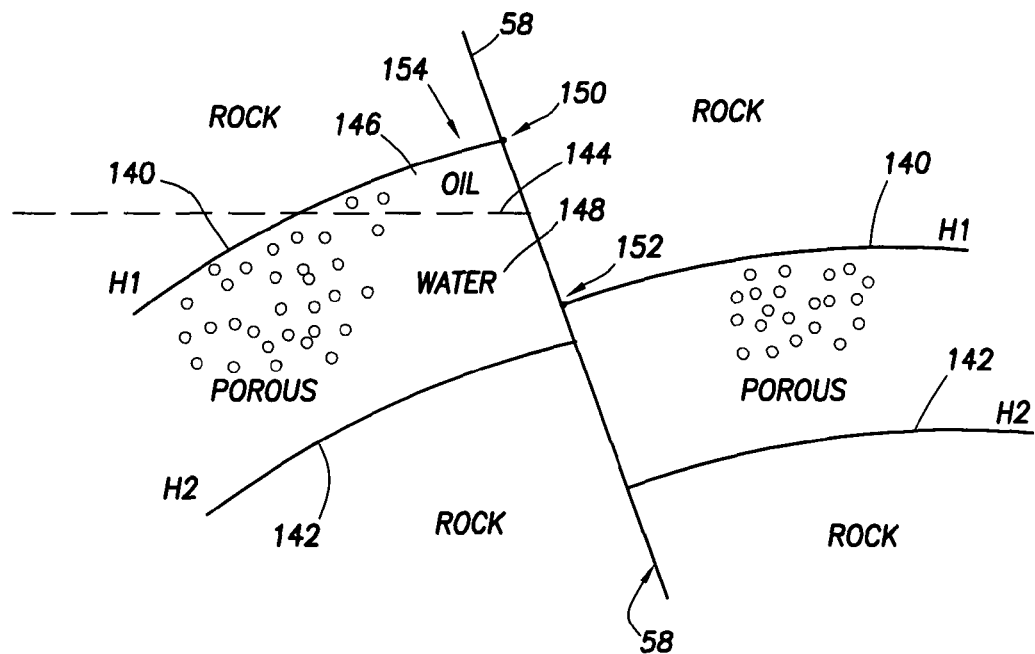
FIGS. 27 and 28 illustrate the ultimate purpose of the above referenced method for Field Management (including the Field Management Framework illustrated in FIGS. 1 through 26 that is adapted to be coupled to and decoupled from the reservoir and network simulators via the open interface of the adaptors of the FM Framework for integrated optimization of reservoir field development and planning and operation); that is, to extract oil and/or gas from an Earth formation, FIG. 27 illustrating the characteristics of the Earth formation, and FIG. 28 illustrating a drilling rig that is used for extracting the oil and/or gas from the Earth formation of FIG. 27.
Figure 28:
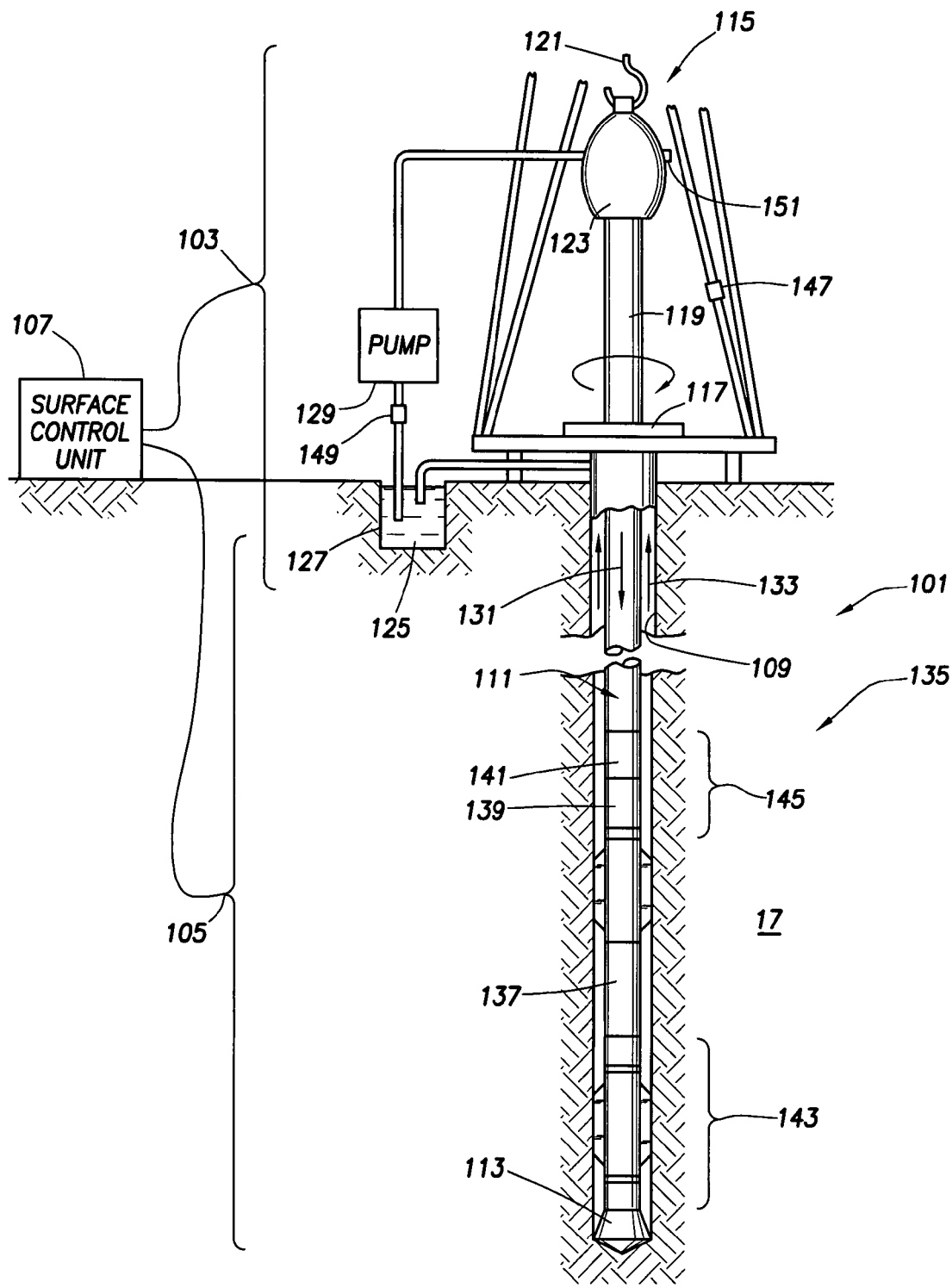

Refer now to FIGS. 27 and 28. These FIGS. 27 and 28 illustrate the ultimate purpose of the above referenced 'method for Field Management' (including the Field Management Framework 12 illustrated in FIGS. 1 and 14 that is adapted to be coupled to and decoupled from the reservoir and network simulators via the open interface of the adaptors of the FM Framework for integrated optimization of reservoir field development and planning and operation); that is, to extract oil and/or gas from an Earth formation. FIG. 27 illustrates the characteristics of the Earth formation, and FIG. 28 illustrates a drilling rig that can be used for extracting the oil and/or gas from the Earth formation of FIG. 27.

In FIG. 27, a first horizon (H1) 140 and a second horizon (H2) 142 are intersected by the 'fault surface' 58. Now that the 'fault surface' 58 has been defined, it is necessary to interpret a well log output record and the reduced seismic data output record to define the precise location of the 'underground deposits of hydrocarbon' in an Earth formation. For example, in FIG. 27, the 'fault surface' 58 cuts through the first horizon 140 and the second horizon 142 in the Earth formation. A line 144 represents a separation between oil 146 and water 148, the oil 146 and water 148 existing on one side of the 'fault surface' 58. Rock and porous material exists on the other side of the 'fault surface' 58. The 'fault surface' 58 intersects the horizons (H1) 140 and (H2) 142 at two places, a first intersection 150 and a second intersection 152. From FIG. 27, it is evident that oil 146 usually exists near the intersections 150 and 152 between the 'fault surface' 58 and the horizons (H1) 140 and (H2) 142. In order to extract the oil 146 from the Earth formation, it is necessary to drill near the first intersection 150 at point 154.

Referring to FIG. 28, recalling from FIG. 27 that it would be necessary to drill near the first intersection 150 at point 154 in order to extract the oil 146 from the Earth formation, a drilling rig can be placed on the Earth's surface directly above the point 154 of FIG. 27 for the purpose of extracting the oil 146 from the Earth formation.

In FIG. 28, an example of that drilling rig 101 is illustrated. The drilling rig 101 is situated above a 'particular location' in the Earth formation (that is, above the point 154 in the Earth's formation of FIG. 27) where the oil and/or gas is potentially located. In FIG. 28, one embodiment of the drilling rig 101 includes a surface system 103, a downhole system 105, and a surface control unit 107. In the illustrated embodiment, a borehole 109 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs. The downhole system 105 includes a drill string 111 suspended within the borehole 109 with a drill bit 113 at its lower end. The surface system 103 includes the land-based platform and derrick assembly 115 positioned over the borehole 109 penetrating a subsurface formation 17. The assembly 115 includes a rotary table 117, kelly 119, hook 121, and rotary swivel 123. The drill string 111 is rotated by the rotary table 117, energized by means not shown, which engages the kelly 119 at the upper end of the drill string. The drill string 111 is suspended from a hook 121, attached to a traveling block (also not shown), through the kelly 119 and a rotary swivel 123 which permits rotation of the drill string relative to the hook. The surface system further includes drilling fluid or mud 125 stored in a pit 127 formed at the well site. A pump 129 delivers the drilling fluid 125 to the interior of the drill string 111 via a port in the swivel 123, inducing the drilling fluid to flow downwardly through the drill string 111 as indicated by the directional arrow 131. The drilling fluid exits the drill string 111 via ports in the drill bit 113, and then circulates upwardly through the region between the outside of the drill string and the wall of the borehole, called the annulus, as indicated by the directional arrows 133. In this manner, the drilling fluid lubricates the drill bit 113 and carries formation cuttings up to the surface as it is returned to the pit 127 for recirculation. The drill string 111 further includes a bottom hole assembly (BHA), generally referred to as 135, near the drill bit 113 (in other words, within several drill collar lengths from the drill bit). The bottom hole assembly includes capabilities for measuring, processing, and storing information, as well as communicating with the surface. The BHA 135 further includes drill collars 137, 139, and 141 for performing various other measurement functions. Drill collar 137 of BHA 135 includes an apparatus 143 for determining and communicating one or more properties of the formation 17 surrounding borehole 109, such as formation resistivity (or conductivity), natural radiation, density (gamma ray or neutron), and pore pressure. Drill collar 139 houses a measurement-while-drilling (MWD) tool. The MWD tool further includes an apparatus for generating electrical power to the downhole system. While a mud pulse system is depicted with a generator powered by the flow of the drilling fluid 125 that flows through the drill string 111 and the MWD drill collar 141, other power and/or battery systems may be employed. Sensors are located about the wellsite to collect data, preferably in real time, concerning the operation of the wellsite, as well as conditions at the wellsite. For example, monitors, such as cameras 147, may be provided to provide pictures of the operation. Surface sensors or gauges 149 are disposed about the surface systems to provide information about the surface unit, such as standpipe pressure, hookload, depth, surface torque, rotary rpm, among others. Downhole sensors or gauges 151 are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the surface system, the downhole system and/or the surface control unit. The MWD tool 141 includes a communication subassembly 145 that communicates with the surface system. The communication subassembly 145 is adapted to send signals to and receive signals from the surface using mud pulse telemetry. The communication subassembly may include, for example, a transmitter that generates a signal, such as an acoustic or electromagnetic signal, which is representative of the measured drilling parameters. The generated signal is received at the surface by transducers, represented by reference numeral 151, that convert the received acoustical signals to electronic signals for further processing, storage, encryption and use according to conventional methods and systems. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Figure 29:
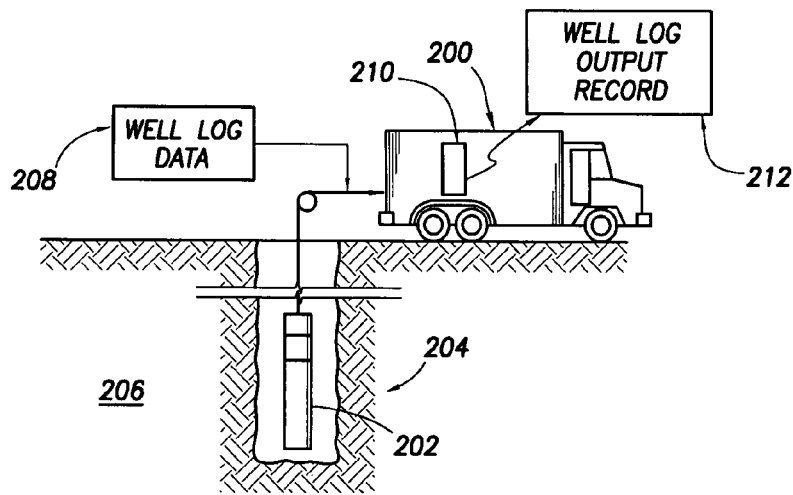
FIGS. 29 and 30 illustrate a method for generating a well log output record.
Figure 30:
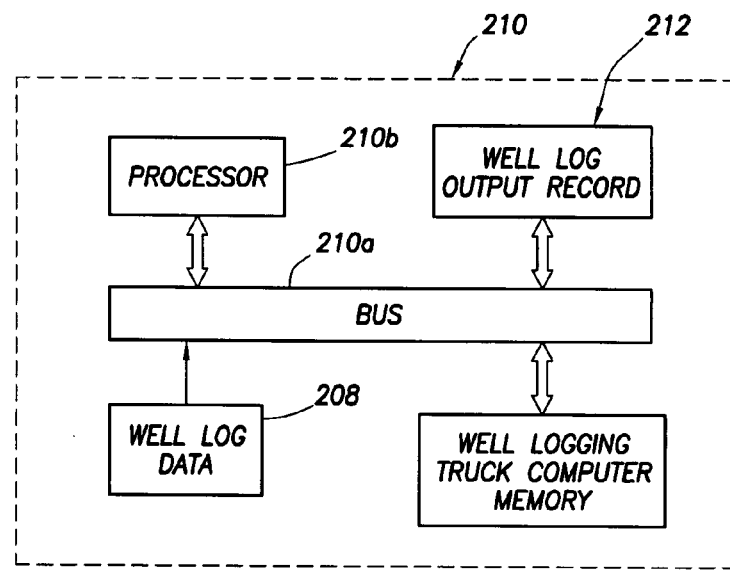
Figure 34:
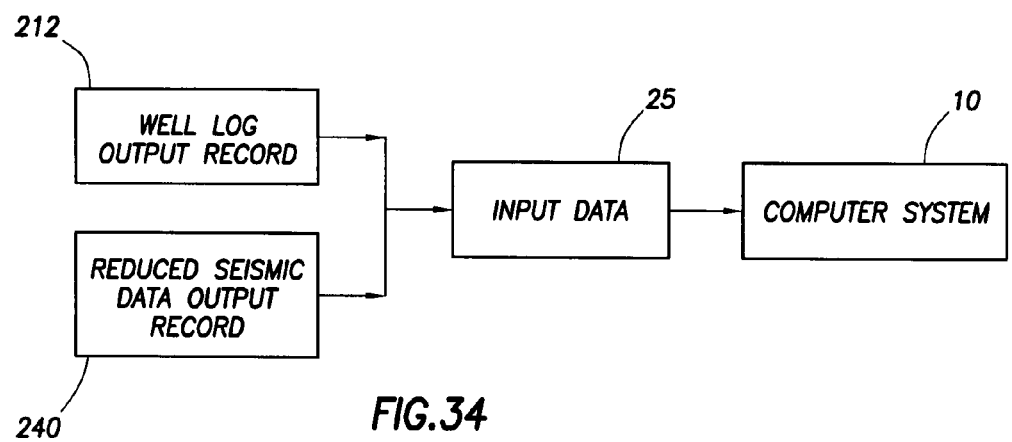
FIG. 34 illustrates how the well log output record and the reduced seismic data output record collectively represent the 'input data' 25 that is input to the computer system 10 of FIG. 1.
Figure 31:
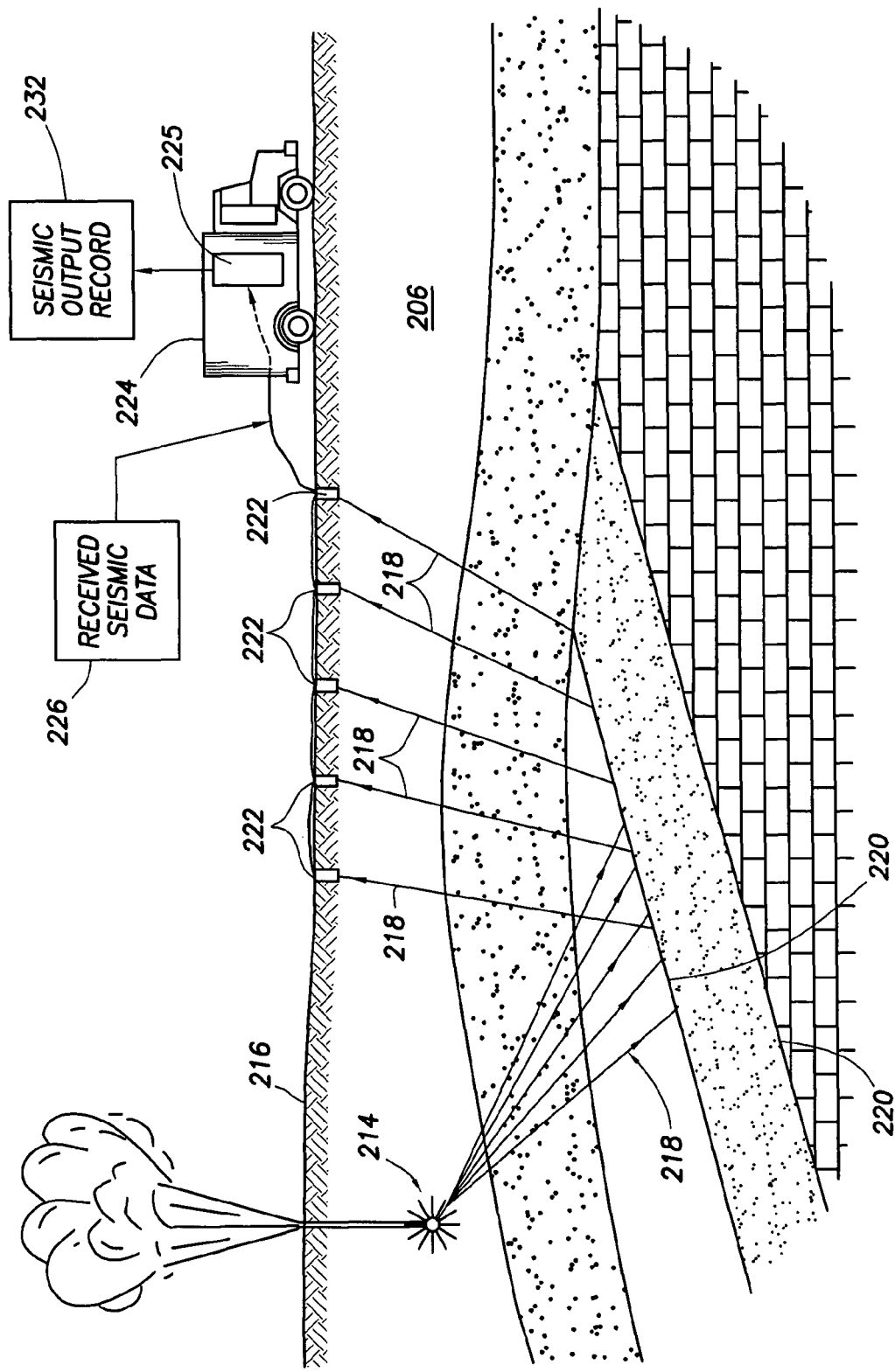
FIGS. 31, 32, and 33 illustrate a method for generating a reduced seismic data output record.
Figure 32:
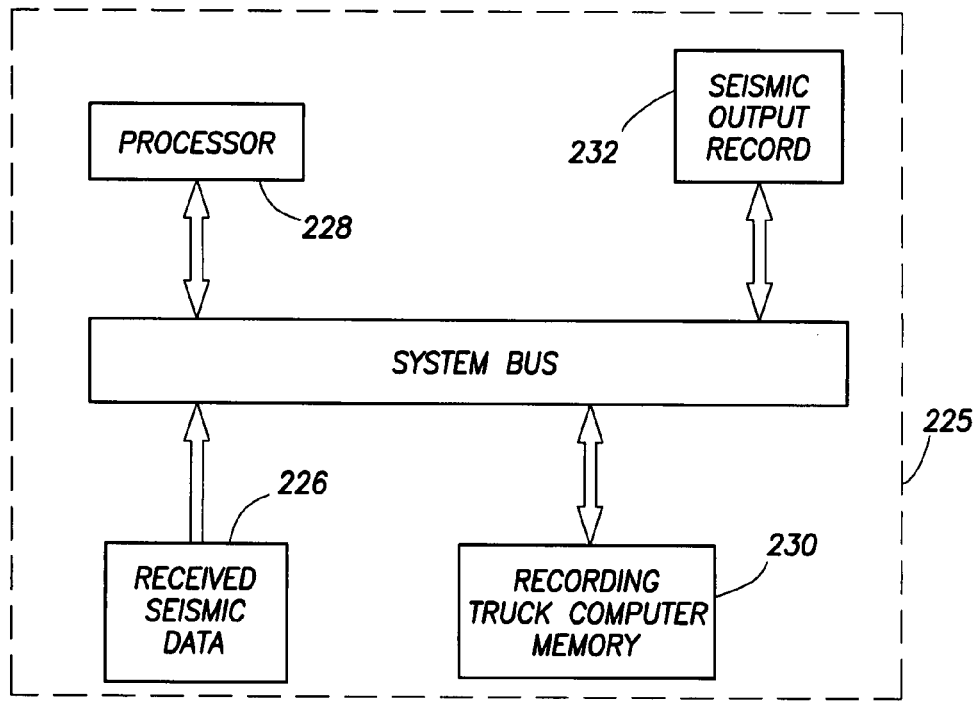
Figure 33:
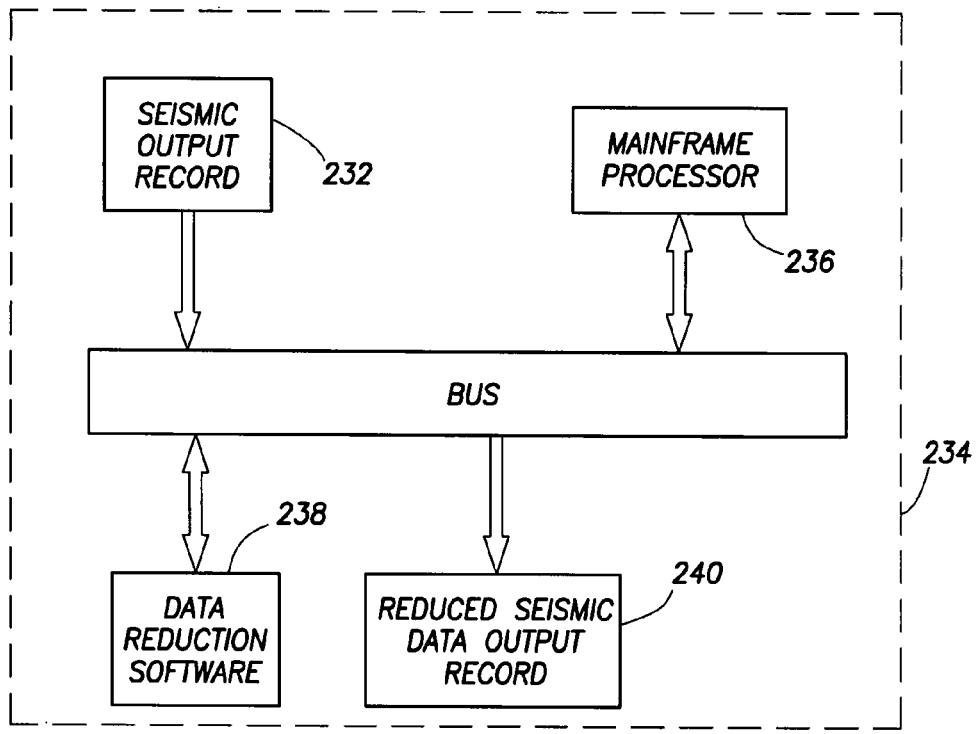

Refer now to FIGS. 29 through 34. Recall from FIG. 1 that 'input data' 25 is provided to the computer system 10 and that the processor 10a executes the 'software' stored in the memory 10c in response to that 'input data' 25. The details of the 'input data' 25 of FIG. 1 that is provided to the computer system 10 will be discussed below with reference to FIGS. 29 through 34 of the drawings. FIGS. 29 and 30 illustrate a method for generating a well log output record. FIGS. 31, 32, and 33 illustrate a method for generating a reduced seismic data output record. FIG. 34 illustrates how the well log output record and the reduced seismic data output record collectively represent the 'input data' 25 that is input to the computer system 10 of FIG. 1.

In FIG. 29, a well logging truck 200 lowers a logging tool 202 into the wellbore 204 and the logging tool 202 stimulates and energizes the Earth formation 206. In response, sensors in the logging tool 202 receive signals from the formation 206, and, in response thereto, other signals representative of well log data 208 propagate uphole from the logging tool 202 to a well logging truck computer 210. A well log output record 212 is generated by the well logging truck computer 210 which displays the well log data 208.

In FIG. 30, a more detailed construction of the well logging truck computer 210 is illustrated. A bus 210a receives the well log data 208 and, responsive thereto, the well log output record 212 is generated by the processor 210b, the well log output record 212 displaying and/or recording the well log data 208. The well log output record 212 is input to the interpretation workstation of FIG. 34.

In FIG. 31, an apparatus and associated method for performing a three dimensional (3D) seismic operation at a location on the earth's surface near the wellbore of FIG. 29 is illustrated.

In FIG. 31, an explosive or acoustic energy source 214 situated below the surface of the earth 216 detonates and generates a plurality of sound or acoustic vibrations 218 which propagate downwardly and reflect off a horizon layer 220 within the Earth formation 206. The horizon layer 220 could be a top layer of rock or sand or shale. When the sound vibrations reflect off the horizon layer 220, the sound vibrations 218 will propagate upwardly and will be received in a plurality of receivers 222 called geophones 222 situated at the surface of the earth. The plurality of geophones 222 will each generate an electrical signal in response to the receipt of a sound vibration therein and a plurality of electrical signals will be generated from the geophones 222, the plurality of signals (referred to as 'received seismic data 226') being received in a recording truck 224. The plurality of electrical signals from the geophones 222 (that is, the 'received seismic data' 226) represent a set of characteristics of the earth formation including the horizons 220 located within the earth below the geophones 222. The recording truck 224 contains a computer 225 which will receive and store the plurality of signals received from the geophones 222. A seismic output record 232 will be generated from the computer 225 in the recording truck 224 which will include and/or display and/or store the plurality of electrical signals that are representative of the characteristics of the earth formation including the horizons 220 located within the earth below the geophones 222.

In FIG. 32, a more detailed construction of the recording truck computer 225 is illustrated. The recording truck computer 225 of FIG. 32 includes a processor 228 and a memory 230 connected to a system bus. The electrical signals, received from the geophones 222 during the 3D seismic operation and referred to as the 'received seismic data' 226, would be received into the recording truck computer 225 via the "Received Seismic Data" block 226 in FIG. 32 and would be stored in the memory 230 of the recording truck computer 225. When desired, a seismic output record 232 is generated by the recording truck computer 225, the seismic output record 232 being adapted for recording and displaying "a plurality of seismic data" representing the 'received seismic data' traces or sets of electrical signals received by the recording truck computer 225 from the geophones 222.

In FIG. 33, a simplified diagram of a mainframe computer 234 is illustrated which uses a stored "data reduction software" to perform a "data reduction" operation on the "plurality of seismic data" included in the seismic output record 232 of FIG. 32. The mainframe computer 234 produces a "reduced seismic data output record" 240 in FIG. 33 which is adapted for recording and displaying information that represents "reduced" versions of the "plurality of seismic data" included in the seismic output record 232 of FIG. 33. The mainframe computer 234 of FIG. 33 includes a mainframe processor 236 connected to a system bus and a memory 238 also connected to the system bus which stores a "data reduction software" therein. The seismic output record 232 of FIG. 32, which includes the "plurality of seismic data", is connected to the system bus of the mainframe computer 234 of FIG. 33. As a result, the "plurality of seismic data", included in the seismic output record 232 of FIG. 33, is now being input to the mainframe processor 236 of FIG. 33. The processor 236 of the mainframe computer 234 in FIG. 33 executes the "data reduction software" stored in the memory 238 of the mainframe computer. The "data reduction software", which is stored in the memory 238 of the mainframe computer 234 of FIG. 33, can be found in a book entitled "Seismic Velocity Analysis and the Convolutional Model", by Enders A. Robinson, the disclosure of which is incorporated by reference into this specification. When the "data reduction software" in memory 238 is executed, the mainframe processor 236 will perform a "data reduction" operation on the "plurality of seismic data" that is included in the seismic output record 232 of FIG. 33. When the "data reduction operation" is complete, the mainframe processor 236 will generate a "reduced seismic data output record" 240 which will record and is adapted for displaying information representing a "reduced version" of the "plurality of seismic data" included in the seismic output record 232 of FIG. 33, and including a set of characteristics pertaining to the earth formation located near the wellbore of FIG. 29, the characteristics including the location and structure of the horizons 220 of FIG. 31.

In FIG. 34, the well log output record 212 of FIG. 29 and the reduced seismic data output record 240 of FIG. 33 collectively and in-combination represent the 'input data' 25 of FIG. 1 that is input to the computer system 10 of FIG. 1.

A functional description of the operation of the 'FM Framework' 12 of FIGS. 1 and 14 will be set forth in the following paragraphs with reference to FIGS. 1 through 34 of the drawings.

As noted earlier, 'Field management (FM)' is a simulation workflow involving the generation of 'predictive scenarios' in order to assist in field development plans, surface facility design/de-bottlenecking, uncertainty/sensitivity analysis, and instantaneous or lifetime revenue optimization from a hydrocarbon field. The generation of these 'predictive scenarios' during the FM simulation workflow involve, among others, the usage of reservoir simulators (18a, 18b of FIG. 14), surface-network simulators (20a, 20b of FIG. 14), process-modeling simulators, and economics packages. The computer system 10 of FIG. 1 will generate these 'predictive scenarios' by executing the 'FM simulation workflow' software (including the 'FM Framework' 12) that is stored in the memory 10c of the computer system 10 of FIG. 1 in response to the 'input data' 25. The 'input data' 25 is shown in FIG. 34, the 'input data' 25 being generated as shown in FIGS. 29-33. The 'Recorder or Display Device' 10d of the computer system of FIG. 1 will record or display these 'predictive scenarios'. When these 'predictive scenarios' are generated by the computer system 10 of FIG. 1, a drilling rig, similar to the drilling rig 101 shown in FIG. 28, can attempt to extract the oil and/or gas and/or other hydrocarbons from the Earth formation. An example of the Earth formation is shown in FIG. 27.

The function of 'Field Management' has been distributed among reservoir simulators and a controller that couples the reservoir simulators to surface facility network simulators.

In this specification, an independent and unified 'FM Framework' 12 of FIGS. 1 and 14 is disclosed which is completely decoupled from surface facility network simulators 20a, 20b and subsurface reservoir simulators 18a, 18b, as shown in FIG. 14. The 'FM Framework' 12 of FIGS. 1 and 14 represents the 'FM simulation workflow' software that is stored in the memory 10c of the computer system 10 of FIG. 1.

However, even though the 'FM Framework' 12 of FIG. 14 is completely decoupled from surface facility network simulators 20a, 20b and subsurface reservoir simulators 18a, 18b, the 'FM Framework' 12 is 'Portable', and, as a result, the surface facility network simulators 20a, 20b and the subsurface reservoir simulators 18a, 18b can be subsequently re-coupled to the 'FM Framework' 12. The 'FM Framework' 12 is 'Portable' because it has a clearly defined 'adaptor interface' for simulators (surface and subsurface) and external FM algorithms. Any black-box simulator may become part of the Field Management (FM) system by simply adhering to the FM 'adaptor interface'. The FM 'adaptor interface' helps decouple mathematical modeling details from reservoir engineering concepts. This means that the Field Management (FM) strategies remain unchanged when the details of the underlying mathematical model changes. In particular, the 'FM Framework' 12 of FIG. 14 is 'Portable' because the 'FM Framework' 12 includes one or more adaptors 14a, 14b, 16a, 16b, each adaptor having a corresponding 'open interface' 22a, 22b, 24a, 24b. As a result, one or more of the surface or subsurface simulators 18a, 18b, 20a, 20b of FIG. 14 (and one or more external Field Management algorithms) can be operatively coupled to the 'FM Framework' 12 via the 'open interface' 22a, 22b, 24a, 24b of an adaptor 14a, 14b, 16a, 16b of the 'FM Framework' 12 for the purpose of performing Field Management functions. The simulators 18a, 18b of FIG. 14 can be operatively coupled to the 'FM Framework' 12 by adhering to the published 'interface characteristics' 35 of FIG. 15 associated with the open interface 22a, 22b of the adaptors 14a, 14b of the 'FMReservoirMgr' node 12a of the FM Framework 12 of FIG. 14. The simulators 20a, 20b of FIG. 14 can be operatively coupled to the 'FM Framework' 12 by adhering to the published 'interface characteristics' 37 of FIG. 17 associated with the open interface 24a, 24b of the adaptors 16a, 16b of the 'NetworkMgr' node 12b of the FM Framework 12 of FIG. 14.

When the one or more of the surface and/or subsurface simulators 18a, 18b, 20a, 20b of FIG. 14 (and/or the one or more external Field Management algorithms) are operatively coupled to the 'FM Framework' 12 of FIG. 14 via the 'open interface' 22a, 22b, 24a, 24b of the adaptors 14a, 14b, 16a, 16b of the 'FM Framework' 12 (in the manner described above) for the purpose of performing Field Management functions, the following steps of FIG. 2, representing a 'Field Management Strategy' associated with a 'method for Field Management', can be practiced by the 'FM Framework' 12 of FIGS. 1 and 14: checking if execution of a Field Management (FM) strategy is needed, step 26 in FIG. 2. If execution of the FM strategy is needed in response to the checking step, checking if there is any balancing action in the strategy. If there is a balancing action, execute the balancing action, step 27 in FIG. 2. Then, determine if there is an instruction in the FM strategy's list of instructions, step 28 of FIG. 2. If there is an instruction in the FM strategy's list of instructions, determine if a triggering criterion of the instruction is met, step 30 of FIG. 2. If the triggering criterion of the instruction is met, determine if a success criterion of the instruction is met, step 32 of FIG. 2. If the success criterion of the instruction is not met, determine if there are any actions in the instruction's list of actions, step 34 of FIG. 2. If there are actions in the instruction's list of actions, executing the actions, step 36 of FIG. 2, a Field Management Strategy being executed when the actions are executed. In response to the step of executing the actions, determine if the actions modified a topology in a predetermined manner such that balancing (i.e., executing the balancing action) is required, step 38 of FIG. 2. If the balancing is required, perform a balancing action, step 40 of FIG. 2.

In addition to 'Portability', the 'FM Framework' 12 of FIGS. 1 and 14 is also 'Flexible'. The 'FM Framework' 12 is 'Flexible' because it enables the user to control the settings of Field Management (FM) strategies allowing for a flexible system that handles conventional cases as well as complicated use cases. That is, the 'FM Framework' 12 allows control over how the 'FM Framework' logic is executed, in order to accommodate real field situations that require such control. The 'FM Framework' 12 flexibility is demonstrated through control of the frequency at which the balancing action is executed, a use by the 'FM framework' 12 of a set of expressions, and a use by the 'FM framework' 12 of dynamic lists of flow entities. The 'Flexibility' of the 'FM Framework' 12 is illustrated by the following examples.

In FIG. 4, an illustration of the 'Flexibility' of the 'FM Framework' 12 of FIGS. 1 and 14 reflects the frequency at which a balancing action is executed by the 'FM Framework' 12. Referring back to the steps of FIG. 2 representing a 'Field Management Strategy' corresponding to a method for 'Field Management' associated with the 'FM Framework' 12, in FIG. 4, the following steps represent the 'Flexibility' of the 'FM Framework' 12 in terms of the frequency at which a balancing action is executed: (1) One of the strategy's instructions consists on choking back wells to reduce the fluid flow velocity in all wells' tubing to keep it below the erosional velocity, step 48 of FIG. 4, (2) Choking back the well takes place incrementally so that a well is not choked back more than needed, step 50 of FIG. 4, (3) Choking back one or more than one well impacts the fluid flow in the surface facility network, step 52 of FIG. 4, (4) Solving the surface facility network model is basically needed after every single incremental choking in any well, which might be prohibitively expensive in terms of CPU time, step 54 in FIG. 4, and (5) Depending on the speed/accuracy requirements, the 'FM framework' 12 provides the engineer the options to balance the surface facility network (balancing action) at any of the following levels: (5a) After every single incremental choking back of any well at every reservoir simulator's Newton iteration, (5b) After choking back the well to have its velocity below the limit given the current flow conditions of the well at every reservoir simulator's Newton iteration, (5c) After choking back all wells to have them obey the erosional velocity limit at every reservoir simulator's Newton iteration, (5d) Just at the beginning of every time step, and (5e) Just every two months, or any number of days, step 56 of FIG. 4.

In FIG. 5, an illustration of the 'Flexibility' of the 'FM Framework' 12 of FIGS. 1 and 14 reflects its use of Expressions. Therefore, in FIG. 5, the following steps represent the 'Flexibility' of the 'FM Framework' 12 in terms of its use of Expressions: (1) When building a strategy for predicting a field future production, the engineer uses the Expressions of the 'FM Framework' 12 of FIGS. 1 and 14 for: (1a) Ordering of entities in building dynamic flow-entity lists, (1b) Selection-criteria for building dynamic list of entities, (1c) Triggering and success-criteria for instructions, (1d) Constraints/objectives for balancing actions, and (1e) Customized Field Management (FM), step 57 of FIG. 5; (2) When building an expression, the engineer can use any property (e.g. production oil rate, reservoir volume gas injection rate, bottom hole pressure, etc.) and any appropriate flow entity status (open, closed, shut, etc.) combined to any appropriate flow entity (well, well list, completions, etc), step 60 of FIG. 5; and (3) Expressions can be as complex as necessary and appropriate (linear, non-linear, etc); Expressions can be nested to use more sophisticated expressions, step 62 of FIG. 5.

In FIG. 6, an illustration of the 'Flexiblity' of the 'FM Framework' 12 of FIGS. 1 and 14 reflects its use of Flow Entities. Therefore, in FIG. 6, the following steps represent the 'Flexibility' of the 'FM Framework' 12 in terms of its use of Flow Entities: (1) The engineer wants to build a strategy in which he/she has a field water production limit to obey; He/she decides that the optimal scenario consists on performing the following every time the water production limit is hit: (1a) Select the group of wells that is producing above a predefined water cut, (1b) Select the well in that group that is producing most water, (1c) Select the completion from that well that is producing most water, and (1d) Shut the selected completion, step 64 of FIG. 6; (2) The engineer builds a dynamic list of groups to which only groups with water cut higher the predefined limit belong (membership to the list gets updated every time the list is used); The list, when updated, results on selecting the group that has the highest water cut among all groups that belong to the list, step 66 of FIG. 6; (3) The engineer builds a dynamic list of wells that, when updated, results on the well with the highest water production rate among all the production wells that belong to the selected group, step 68 of FIG. 6; and (4) The engineer builds a dynamic list of well completions that, when updated, results on the completion with the highest water production rate among all the completions of the selected well, step 70 of FIG. 6.

In addition to 'Portability' and 'Flexiblity', the 'FM Framework' 12 of FIGS. 1 and 14 is also 'Extensible'. The 'FM Framework' 12 is 'Extensible' because of its use of custom variables, custom actions, and custom strategies. Custom variables, custom actions, and custom strategies enable the construction of 'extensions' to the 'FM Framework' 12. These 'extensions' enable almost every conceivable use case to be handled by the 'FM Framework' 12. These 'extensions' may be made at run-time on the user's platform, without the need for a development cycle and additional software or hardware, other than that provide through the Field Management (FM) system. These 'extensions' may then be saved and reused for application to multiple cases. The 'Extensibility' of the 'FM Framework' 12 is illustrated by the following examples.

In FIG. 7, an illustration of the 'Extensiblity' of the 'FM Framework' 12 of FIGS. 1 and 14 reflects its use of Custom Variables. Therefore, in FIG. 7, the following steps represent the 'Extensibility' of the 'FM Framework' 12 in terms of its use Custom Variables: (1) The engineer wants to build a simulation model to predict future production from a hydrocarbon reservoir, step 72 of FIG. 7; (2) He/she decides to build one or more strategies using either the FM provided strategy framework or his/her own custom strategy (or strategies), step 74 of FIG. 7; (3) In the process of building the strategy (or strategies), the engineer decides to build one or more actions to be incorporated into instructions, step 76 of FIG. 7; and (4) In the process of building the different instructions, expressions are needed at different levels; Expressions can be built using provided properties (and flow entities); If provided ingredients are not enough to accommodate very special requirements, custom variables can be used to accommodate the engineer's plans; Custom variables can be used in combination with all existing ingredients in the FM framework, step 78 of FIG. 7.

In FIG. 8, an illustration of the 'Extensibility' of the 'FM Framework' 12 of FIGS. 1 and 14 reflects its use of Custom Actions. Therefore, in FIG. 8, the following steps represent the 'Extensibility' of the 'FM Framework' 12 in terms of its use Custom Actions: (1) The engineer wants to build a simulation model to predict future production from a hydrocarbon reservoir, step 80 of FIG. 8; (2) She/he decides to build one or more strategies using either the FM provided strategy framework or his/her own custom strategy (or strategies); step 82 of FIG. 8; (3) Can all what he/she has in mind in terms of setting/removing/modifying constraints or applying modifications on flow entities be implemented through the provided set of actions (?), step 84 of FIG. 8; (4) If yes, select among the provided actions, step 86 of FIG. 8; and (5) If no, build as many custom actions as needed to be incorporated in the strategy's (or strategies) set of instructions; These custom actions can always be combined with provided actions to build these instructions, step 88 of FIG. 8.

In FIG. 9, an illustration of the 'Extensibility' of the 'FM Framework' 12 of FIGS. 1 and 14 reflects its use of Custom Strategies. Therefore, in FIG. 9, the following steps represent the 'Extensibility' of the 'FM Framework' 12 in terms of its use Custom Strategies: (1) The engineers wants to build a simulation model to predict future production from a hydrocarbon reservoir, step 90 of FIG. 9; (2) Is the FM strategy as illustrated in FIG. 2 flexible enough to accommodate what he/she has in mind (?), step 92 of FIG. 9; (3) If yes, build the strategy using the strategy ingredients provided by the FM framework 12, step 94 of FIG. 9; and (4) If no, build a custom strategy that circumvent the provided FM framework; Strategy ingredients as provided by the FM framework 12 can be still used (instructions, actions, expressions, flow entities, variables, . . . ), step 96 of FIG. 9.

Nomenclature

EVR=Erosional velocity ratio

FM=Field Management

GOR=Gas-to-oil ratio

WCT=Water-to-liquid ratio

REFERENCES

The following 'references (1) through (7)' are incorporated by reference into the specification of this application:

1. Ghorayeb, K. et al.: "A General Purpose Controller for Coupling Multiple Reservoir Simulations and Surface Facility Networks," paper SPE 79702 presented at the 2003 SPE Reservoir Simulation Symposium, Houston, Tex., USA (Feb. 3-5, 2003).
2. Ghorayeb, K., Holmes, J. A., and Torrens R.: "Field Planning Using Integrated Surface/Subsurface Modeling," paper SPE 92381 presented at the 2005 SPE Middle East Oil & Gas Show and Conference, Bahrain (Mar. 12-15, 2005).
3. Barroux, C. C. et al.: "Linking Reservoir and Surface Simulators: How to Improve the Coupled Solutions," paper SPE 65159 presented at the SPE European Petroleum Conference, Paris, France (Oct. 24-25, 2000).
4. Ghorayeb, K. and Holmes, J. A: "Black Oil Delumping," paper SPE 96571 presented at the 2005 SPE Annual Technical Conference and Exhibition, Dallas (Oct. 9-12, 2005).
5. www.python.org
6. www.mathworks.com
7. Guyaguler, B. and Byer, T.: "A New Production Allocation Optimization Framework", paper SPE 105200 Presented at the 2007 SPE Reservoir Simulation Symposium, Houston, Tex., USA, (Feb. 26-28, 2007).

| SI Metric Conversion Factors | |
|---|---|
| °F. | (°F. + 459.67)/1.8 = K |
| Mscf × 3.048* | E+02 = m$^3$ |
| MMscf × 3.048* | E+05 = m$^3$ |
| STB × 1.589 873 | E−01 = m$^3$ |

*Conversion factor is exact

The above description of the 'FM Framework' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method of managing a plurality of wells in a field, comprising:
    receiving, during runtime of a Field management Framework, on a user's platform, a custom balancing action defined in a scripting language;
    receiving, during the runtime of the Field Management Framework on the user's platform and by the Field Management Framework, a custom strategy associated with the plurality of wells, wherein the custom strategy comprises an instruction relating the custom balancing action to a triggering criterion defining a first target associated with a respective first well of the plurality of wells, wherein the custom balancing action comprises adjusting a flow rate associated with a second well of the plurality of wells to a target flow rate, and wherein the custom strategy is defined in the scripting language;
    determining, by the Field Management Framework executing the instruction and based on input data collected by one or more sensors associated with the first well, that the first target is outside an acceptable range;
    implementing, by the Field Management Framework using a surface network simulator, the custom balancing action to bring the first target within the acceptable range;
    identifying, by the Field Management Framework, that the custom balancing action fails to bring the first target within the acceptable range;
    implementing, by the Field Management Framework, a topology modifying action to modify a topology of the plurality of wells in response to the custom balancing action failing to bring the first target within the acceptable range,
        wherein the topology modifying action adds a new flow rate constraint for the second well,
        wherein the new flow rate constraint is a boundary condition for flow rate in an optimization problem, and
        wherein the optimization problem comprises an objective to increase a ratio of oil to gas; and
    executing, by the Field Management Framework and based on modifying the topology, the surface network simulator to simulate a flow through the plurality of wells and obtain a simulated flow,
    wherein the surface network simulator interfaces via an open application programming interface with an adapter connected to the Field Management Framework.

2. The method of claim 1, further comprising:
    drilling an Earth formation in response to the simulated flow.

3. The method of claim 1, wherein the input data comprises a well log output record obtained in response to a well logging operation, and a reduced seismic data output record obtained in response to a seismic operation in a section of the field.

4. The method of claim 1, wherein determining that the first target is outside the acceptable range is further based on a success criterion.

5. The method of claim 1, further comprising:
    in response to implementing the topology modifying action, determining that the topology of the field is modified in a predetermined manner such that further balancing of the field is required.

6. The method of claim 5, further comprising:
    implementing an additional balancing action to allocate flowrates throughout the field.

7. The method of claim 1, wherein the Field Management Framework is characterized as having flexibility based on a frequency at which the custom balancing action is implemented.

8. The method of claim 7, wherein the flexibility of the Field Management Framework is further characterized by a use, by the Field Management Framework, of a set of expressions adapted for ordering of entities in building dynamic flow entity lists, selection criteria for building a dynamic list of the entities, and a success criterion and objectives for the custom balancing action, and customized Field Management.

9. The method of claim 8, wherein the flexibility of the Field Management Framework is further characterized by a use, by the Field Management Framework, of dynamic lists of flow entities adapted for building a dynamic list of groups or a dynamic list of wells or a dynamic list of well completions.

10. A program storage device readable by a machine, tangibly embodying a set of instructions executable by the machine, to perform a method of managing a plurality of wells in a field, the method steps comprising:
    receiving, during runtime of a Field management Framework, on a user's platform, a custom balancing action defined in a scripting language;
    receiving, during the runtime of the Field Management Framework on the user's platform and by the Field Management Framework, a custom strategy associated with the plurality of wells, wherein the custom strategy comprises an instruction relating the custom balancing action to a triggering criterion defining a first target associated with a respective first well of the plurality of wells, wherein the custom balancing action comprises adjusting a flow rate associated with a second well of the plurality of wells to a target flow rate, and wherein the custom strategy is defined in the scripting language;
    determining, by the Field Management Framework executing the instruction and based on input data collected by one or more sensors associated with the first well, that the first target is outside an acceptable range;
    implementing, by the Field Management Framework using a surface network simulator, the custom balancing action to bring the first target within the acceptable range;
    identifying, by the Field Management Framework, that the custom balancing action fails to bring the first target within the acceptable range;
    implementing, by the Field Management Framework, a topology modifying action to modify a topology of the plurality of wells in response to the custom balancing action failing to bring the first target within the acceptable range,
        wherein the topology modifying action adds a new flow rate constraint for the second well wherein the new flow rate constraint is a boundary condition for flow rate in an optimization problem, and
wherein the optimization problem comprises an objective to increase a ratio of oil to gas; and
executing, by the Field Management Framework and based on modifying the topology, the surface network simulator to simulate a flow through the plurality of wells and obtain a simulated flow,
wherein the surface network simulator interfaces via an open application programming interface with an adapter connected to the Field Management Framework.

11. The program storage device of claim 10, further comprising:
drilling an Earth formation in response to the simulated flow.

12. The program storage device of claim 10, wherein the input data comprises a well log output record obtained in response to a well logging operation, and a reduced seismic data output record obtained in response to a seismic operation in a section of the field.

13. The program storage device of claim 10, wherein determining that the first target is outside the acceptable range is further based on a success criterion.

14. The program storage device of claim 10, further comprising:
in response to implementing the topology modifying action, determining that the topology of the field is modified in a predetermined manner such that further balancing of the field is required.

15. The program storage device of claim 14, further comprising:
implementing an additional balancing action to allocate flowrates throughout the field.

16. The program storage device of claim 10, wherein the Field Management Framework characterized as having flexibility based on a frequency at which the custom balancing action is implemented.

17. The program storage device of claim 16, wherein the flexibility of the Field Management Framework is further characterized by a use, by the Field Management Framework, of a set of expressions adapted for ordering of entities in building dynamic flow entity lists, selection criteria for building a dynamic list of the entities a success criterion and objectives for the custom balancing action, and customized Field Management.

18. The program storage device of claim 17, wherein the flexibility of the Field Management Framework is further characterized by a use, by the Field Management Framework, of dynamic lists of flow entities adapted for building a dynamic list of groups or a dynamic list of wells or a dynamic list of well completions.

19. A system for managing a plurality of wells in a field, comprising:
a processor;
a field management (FM) framework executing on the processor and configured to:
receive, during runtime, on a user's platform, a custom balancing action defined in a scripting language;
receive, during the runtime on the user's platform, a custom strategy associated with the plurality of wells, wherein the custom strategy comprises an instruction relating the custom balancing action to a triggering criterion defining a first target associated with a respective first well of the plurality of wells, wherein the custom balancing action comprises adjusting a flow rate associated with a second well of the plurality of wells to a target flow rate, and wherein the custom strategy is defined in the scripting language;
determine, by executing the instruction and based on input data collected by one or more sensors associated with the first well, that the first target is outside an acceptable range;
implement, using a surface network simulator, the custom balancing action to bring the first target within the acceptable range;
identify, by the Field Management Framework, that the custom balancing action fails to bring the first target within the acceptable range;
implement a topology modifying action to modify a topology of the plurality of wells in response to the custom balancing action failing to bring the first target within the acceptable range,
wherein the topology modifying action adds a new flow rate constraint for the second well,
wherein the new flow rate constraint is a boundary condition for flow rate in an optimization problem, and
wherein the optimization problem comprises an objective to increase a ratio of oil to gas; and
execute, based on modifying the topology, the surface network simulator to simulate a flow through the plurality of wells and obtain a simulated flow; and
an adapter connected to the FM framework and comprising:
an open application programming interface for interfacing with the surface network simulator.

20. The system of claim 19, wherein the FM framework is further configured to:
drill an Earth formation in response to the simulated flow.

21. The system of claim 19, wherein the input data comprises a well log output record obtained in response to a well logging operation, and a reduced seismic data output record obtained in response to a seismic operation in a section of the field.

22. The system of claim 19, wherein determining that the first target is outside the acceptable range is further based on a success criterion.

23. The system of claim 19, wherein the FM framework is further configured to:
in response to implementing the topology modifying action, determine that the topology of the field is modified in a predetermined manner such that further balancing of the field is required.

24. The system of claim 23, wherein the FM framework is further configured to:
implement an additional balancing action to allocate flowrates throughout the field.

25. The system of claim 19, wherein the FM framework is characterized as having flexibility based on a frequency at which the custom balancing action in the field is implemented.

26. The system of claim 25, wherein the flexibility of the FM framework is further characterized by a use, by the FM framework, of a set of expressions adapted for ordering of entities in building dynamic flow entity lists, selection criteria for building a dynamic list of entities, a success criterion and objectives for the custom balancing action, and customized Field Management.

27. The system of claim 26, wherein the flexibility of the FM framework is further characterized by a use, by the FM framework, of dynamic lists of flow entities adapted for building a dynamic list of groups or a dynamic list of wells or a dynamic list of well completions.

* * * * *